US012182950B2

(12) United States Patent
Greunke

(10) Patent No.: US 12,182,950 B2
(45) Date of Patent: Dec. 31, 2024

(54) REMOTE EXPERT METHOD AND SYSTEM UTILIZING QUANTITATIVE QUALITY ASSURANCE IN MIXED REALITY

(71) Applicant: THE UNITED STATES OF AMERICA, AS REPRESENTED BY THE SECRETARY OF THE NAVY, Arlington, VA (US)

(72) Inventor: Larry Clay Greunke, Seaside, CA (US)

(73) Assignee: THE UNITED STATES OF AMERICA, AS REPRESENTED BY THE SECRETARY OF THE NAVY, Arlington, VA (US)

( * ) Notice: Subject to any disclaimer, the term of this patent is extended or adjusted under 35 U.S.C. 154(b) by 0 days.

(21) Appl. No.: 18/111,458

(22) Filed: Feb. 17, 2023

(65) Prior Publication Data

US 2023/0260415 A1 Aug. 17, 2023

Related U.S. Application Data

(60) Provisional application No. 63/311,233, filed on Feb. 17, 2022, provisional application No. 63/311,422, filed on Feb. 17, 2022.

(51) Int. Cl.
| | |
|---|---|
| *G06T 19/00* | (2011.01) |
| *G06F 16/2457* | (2019.01) |
| *G06T 13/20* | (2011.01) |
| *G06T 17/20* | (2006.01) |
| *G09B 5/02* | (2006.01) |
| *G09B 19/00* | (2006.01) |

(52) U.S. Cl.
CPC ...... *G06T 19/006* (2013.01); *G06F 16/24573* (2019.01); *G06T 13/20* (2013.01); *G06T 17/20* (2013.01); *G09B 5/02* (2013.01); *G09B 19/003* (2013.01); *G06T 2200/24* (2013.01); *G06T 2210/52* (2013.01)

(58) Field of Classification Search
CPC ....... G06T 19/00; G06T 19/006; G06T 13/20; G06T 17/20; G06T 2200/74; G06T 2210/52; G06F 16/24573; G09B 5/02; G09B 19/00; G09B 19/003
See application file for complete search history.

(56) References Cited

U.S. PATENT DOCUMENTS

| | | | | |
|---|---|---|---|---|
| 2015/0079565 | A1* | 3/2015 | Miller | G16H 50/50 434/262 |
| 2019/0318659 | A1* | 10/2019 | Hamadani | G06F 3/011 |
| 2020/0184850 | A1* | 6/2020 | Pugh | G16H 20/30 |
| 2023/0093342 | A1* | 3/2023 | Murugappan | G06T 7/30 |

* cited by examiner

*Primary Examiner* — Timothy A Musselman
(74) *Attorney, Agent, or Firm* — Herber Martin Carbajal; Scott Bell

(57) ABSTRACT

This disclosure and exemplary embodiments described herein provide a Parallel Content Authoring Method and Tool for Procedural Guidance, and a Remote Expert Method and System Utilizing Quantitative Quality Assurance in Mixed Reality. The implementation described herein is related to the generation of content/instruction set that can be viewed in different modalities, including but not limited to mixed reality, VR, audio text, however it is to be understood that the scope of this disclosure is not limited to such application.

21 Claims, 28 Drawing Sheets

FIG. 9

Example of 2D application with an AR companion Application

Maintainer reads work item for corrosion and reads discrepancy location

Maintainer is physically standing in front of aircraft and is not able to see or understand where corrosion discrepancy is.

Maintainer needs to get a better understanding and clicks button to "Show in AR"

Maintainer puts on AR glasses or phone using pass-through AR and is now able to see desired information that is on the 2D screen but in 3D.

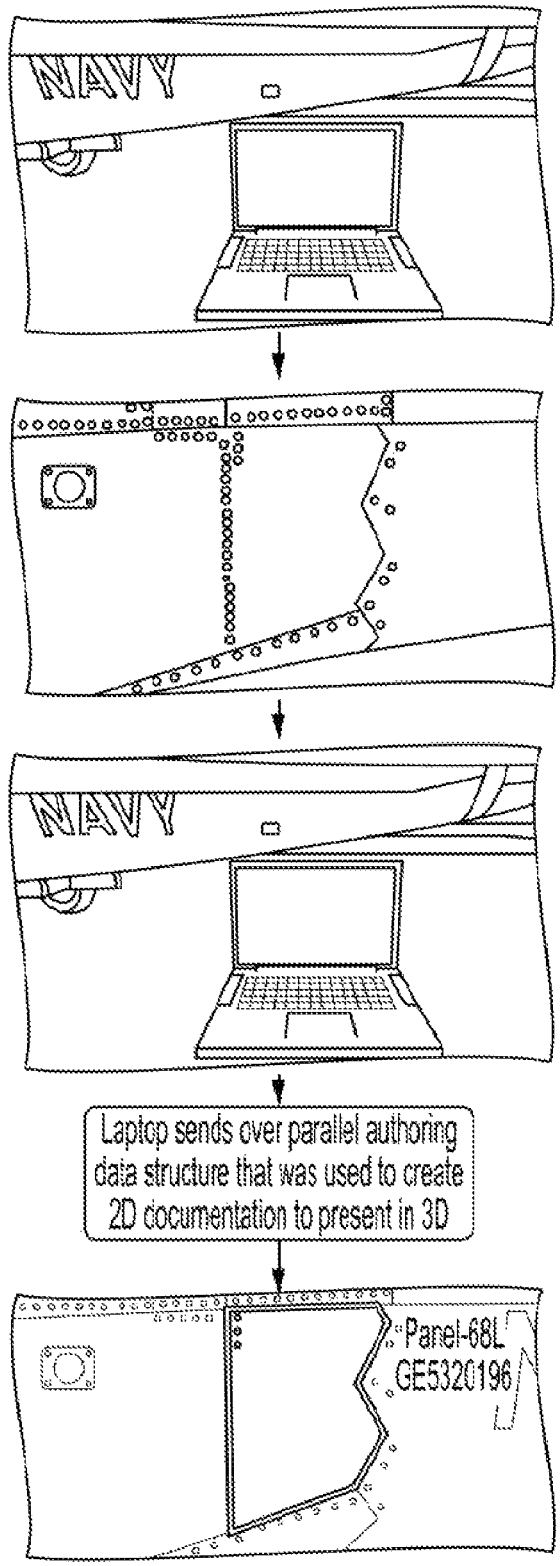

FIG. 14

REMOTE EXPERT METHOD AND SYSTEM UTILIZING QUANTITATIVE QUALITY ASSURANCE IN MIXED REALITY

CROSS REFERENCE TO RELATED PATENT(S) AND APPLICATION(S)

This application claims the benefit of U.S. Provisional Application No. 63/311,233, filed Feb. 17, 2022, and entitled Parallel Content Authoring Tool for Procedural Guidance, and U.S. Provisional Application No. 63/311,422, filed Feb. 17, 2022, and entitled Remote Expert Utilizing Quantitative Quality Assurance in Mixed Reality, which are hereby incorporated in its entirety by reference.

BACKGROUND

This disclosure, and the exemplary embodiments described herein, describe a Parallel Content Authoring Method and System for Procedural Guidance. The implementation described herein is related to the generation of content/instruction set that can be viewed in different modalities, including but not limited to mixed reality, VR, audio text, however it is to be understood that the scope of this disclosure is not limited to such application.

Furthermore, this disclosure, and the exemplary embodiments described herein, describe a Remote Expert Method and System Utilizing Quantitative Quality Assurance in Mixed Reality. The implementation described herein is related to a Remote Expert Tool for use in a Mixed Reality Environment, which according to an exemplary embodiment uses a Content Authoring Method and System as disclosed. However, it is to be understood that the scope of this disclosure is not limited to such application.

Typically, virtual objects are replicated in mixed reality environments using specifications of the physical objects. Creating mixed reality experiences from computer-aided design (CAD) data, supplied by manufacturers, of physical objects may be correct but is not guaranteed. For example, equipment can be upgraded or modified so that CAD models are no longer accurate. Further, it can be expensive to obtain access to the CAD models in the first place. Another option is to reverse engineer the object; however, reverse engineering can also be quite costly. There are vast amounts of preexisting equipment where no 3D model exists to utilize and poses a barrier for mixed reality implementation. Further, in the cases where CAD models do exist, the models are often not immediately viable for a mixed reality experience—first requiring clean up, decimation, texturing, or other work.

Having cost prohibitive, suspect, or missing models have forced content developers to create mixed reality experiences with workflows relying on tool chains geared towards reverse engineering. Some workflows model via 3D scanning equipment creating point clouds where surfaces can be derived through algorithms; however, this is laborious and requires further contextual manipulation to be usable. Other workflows capture discrete points with a portable coordinate measuring machine.

The virtual objects can be used to guide a user through a workflow in the mixed reality environment; however, regardless of instructional delivery method (e.g., memory, book, computer screen, mixed reality experience, etc.), it can be difficult to objectivity assure that the human activity is performed according to the workflow. Most processes for quality assurance are management centric and inject significant human decisions into the process. Inspections of activity, audits of the inspection, sampling, random lot sampling are but a few. Every subjective act, like a signature that attests to the correctness or completeness of a task, adds risk (lost resources). Some companies are exploring techniques that record a person during the process (both with traditional cameras as well as spatial position) or take photographs at key points, but currently these are reviewed by humans for quality assurance and are therefore subjective or they are used for training purposes (expert showing a novice).

Some device designs attempt to incorporate connectivity to enhance the user's experience. For example, an electronically connected torque wrench can send torque values through the connection. However, there is no real time feedback, connectivity to procedure or dynamic adjustments (e.g., whether the tool calibrated and set to the proper setting for that particular activity), archival with location data, or human performance metrics that can make this process more objective.

Internet of things (IoT) sensors can be used to determine device states (e.g., temperature, pressure, connectivity, etc.), which is a good source of objective measure.

However, the sensors does not focus on the granularity of the, for example, repair/assembly procedure. Some procedures can look and operate correctly according to IoT sensors while being constructed incorrectly (wrong width washer, wrong strength bolt—early fail states).

Factory quality assurance can employ automated techniques that are objective. For example, a laser sensor (or computer vision) that determines the size of a widget can reject one that is not the correct size. However, such sensors currently do not evaluate human actions as part of a quality assurance program.

INCORPORATION BY REFERENCE

The following publications are incorporated by reference in their entirety.

US Published Patent Application 2019/0139306, by Mark Billinski, et al., published May 9, 2019, and entitled Hybrid 2D/3D Data in a Virtual Environment, now U.S. Pat. No. 10,438,413.

US Published Patent Application 2021/0019947, by Larry Clay Greunke, et al., published Jun. 21, 2021, and entitled Creation Authoring Point Tool Utility To Recreate Equipment, now U.S. Pat. No. 11,062,523.

US Published Patent Application 2021/0118234, by Christopher James Angelopoulos, et al., published Apr. 22, 2021, and entitled Quantitative Quality Assurance For Mixed Reality, now U.S. Pat. No. 11,138,805.

BRIEF DESCRIPTION

In accordance with one embodiment of the present disclosure, disclosed is a method for parallel content authoring, the method comprising: creating a 3D representation of a target physical system; receiving a part selection from an editor of the 3D representation, the part selection from one of a plurality of parts included in the target physical system; collecting part actions from the editor, the part actions associated with actions to be performed on the selected part; creating queued annotations for the part actions, wherein the queued annotations are to be displayed in a 3D environment with respect to the 3D representation of the target physical system, and wherein at least one of the queued annotations includes a camera position recording based on a type of the corresponding part action and a location of the target system part; collecting and associating augmented reality data with the queued annotations; publishing a data structure bundle including a data set for generation of the queued annotations, the data set parsable to create mixed reality content; and a mixed reality system creating and presenting to a user content including the queued annotations from the data set, where the user interacts with the target physical system and parts included in the parts selection according to the queued annotations.

In accordance with another embodiment of the present disclosure, disclosed is a parallel content authoring system comprising: a mixed reality controller performing a method to: define a coordinate system frame of reference for a target physical system, the coordinate system frame of reference including an initial point of the target physical system and at least one directional axis that are specified by a user of the mixed reality controller; define additional points of the target physical system; and define interface elements of the target physical system; and a computer system performing a method to: generate a 3D model of the target physical system based on the coordinate system frame of reference, the additional points, and the interface elements; receive a part selection from an editor of the 3D representation, the part selection from one of a plurality of parts included in the target physical system; collect part actions from the editor, the part actions associated with actions to be performed on the selected part; create queued annotations for the part actions, wherein the queued annotations are to be displayed in a 3D environment with respect to the 3D representation of the target physical system, and wherein at least one of the queued annotations includes a camera position recording based on a type of the corresponding part action and a location of the target system part; collect and associate augmented reality data with the queued annotations; and publish a data structure bundle including a data set for generation of the queued annotations, the data set parsable to create mixed reality content, wherein a mixed reality system creates and presents to a user content including the queued annotations from the data set, where the user interacts with the target physical system and parts included in the parts selection according to the queued annotations.

In accordance with another embodiment of the present disclosure, disclosed is a non-transitory computer-readable medium comprising executable instructions for causing a computer system to perform a method for parallel content authoring, the instructions when executed causing the computer system to: create a 3D representation of a target physical system; receive a part selection from an editor of the 3D representation, the part selection from one of a plurality of parts included in the target physical system; collect part actions from the editor, the part actions associated with actions to be performed on the selected part; create queued annotations for the part actions, wherein the queued annotations are to be displayed in a 3D environment with respect to the 3D representation of the target physical system, and wherein at least one of the queued annotations includes a camera position recording based on a type of the corresponding part action and a location of the target system part; collect and associating augmented reality data with the queued annotations; publish a data structure bundle including a data set for generation of the queued annotations, the data set parsable to create mixed reality content; and present to a user using an associated mixed reality system content including the queued annotations from the data set, where the user interacts with the target physical system and parts included in the parts selection according to the queued annotations.

In accordance with another embodiment of the present disclosure, disclosed is a method for remote expert utilizing quantitative quality assurance in a mixed reality system, the method comprising: presenting a 3D representation of target equipment to an expert user, wherein a synchronized 3D representation of the target equipment is presented to a novice user; receiving a part selection and a requested action for an equipment part of the target equipment from the expert user; presenting the novice user's performance of the requested action on the equipment part to the expert user, wherein the presentation of the novice user's performance comprises various sensor data collected at the novice user's physical environment location; and generating a confidence assessment of the novice user's performance of the requested action, wherein the confidence assessment specifies whether the expert user rejects the requested action as failing performance requirements.

In accordance with another embodiment of the present disclosure, disclosed is a remote expert system utilizing quantitative quality assurance, the remote expert system comprising: a mixed reality controller performing a method to: define a coordinate system frame of reference for a target physical system, the coordinate system frame of reference including an initial point of the target physical system and at least one directional axis that are specified by a user of the mixed reality controller; define additional points of the target physical system; and define interface elements of the target physical system; and a computer system performing a method to: generate a 3D model of the target physical system based on the coordinate system frame of reference, the additional points, and the interface elements; present the 3D representation of target equipment to an expert user, wherein a synchronized 3D representation of the target equipment is presented to a novice user; receive a part selection and a requested action for an equipment part of the target equipment from the expert user; present the novice user's performance of the requested action on the equipment part to the expert user, wherein the presentation of the novice user's performance comprises various sensor data collected at the novice user's physical environment location; and generate a confidence assessment of the novice user's performance of the requested action, wherein the confidence assessment specifies whether the expert user rejects the requested action as failing performance requirements.

In accordance with another embodiment of the present disclosure, disclosed is a non-transitory computer-readable medium comprising executable instructions for causing a computer system to perform a method for remote expert utilizing quantitative quality assurance in a mixed reality system, the instructions when executed causing the computer system to: present a 3D representation of target equipment to an expert user, wherein a synchronized 3D representation of the target equipment is presented to a novice user; receive a part selection and a requested action for an equipment part of the target equipment from the expert user; present the novice user's performance of the requested action on the equipment part to the expert user, wherein the presentation of the novice user's performance comprises various sensor data collected at the novice user's physical environment location; and generate a confidence assessment of the novice user's performance of the requested action, wherein the confidence assessment specifies whether the expert user rejects the requested action as failing performance requirements.

BRIEF DESCRIPTION OF THE DRAWINGS

For a more complete understanding of the present disclosure, reference is now made to the following descriptions taken in conjunction with the accompanying drawings.

FIG. 9 shows a variation of an application editor geared towards plugging wires into boxes (J11 in Panel G81S01100 "ID Panel" to J26 in panel G81S00560 the "Test Fixture" shown).

FIG. 14 shows an example of having an interaction between a 2D application and an AR companion application utilizing a common data structure according to an exemplary embodiment of this disclosure.

DETAILED DESCRIPTION

Figure 1A:
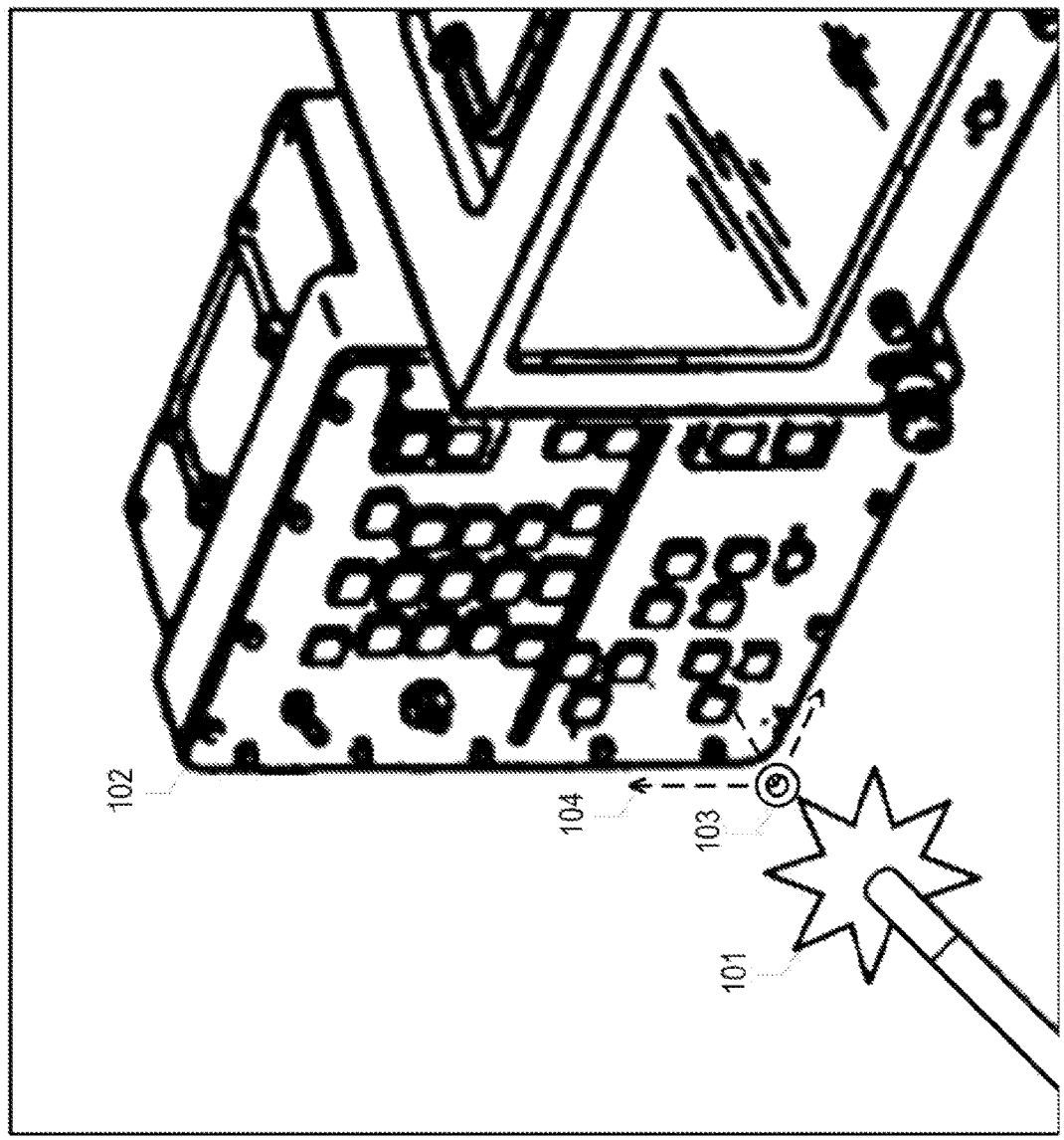
FIGS. 1A-1C illustrate positional data collection for a creation authoring point tool utility.

This disclosure and exemplary embodiments described herein provide a Parallel Content Authoring Method and System for Procedural Guidance. The implementation described herein is related to the generation of content/instruction set that can be viewed in different modalities, including but not limited to mixed reality, VR, audio text, however it is to be understood that the scope of this disclosure is not limited to such application.

Furthermore, this disclosure, and the exemplary embodiments described herein, describe a Remote Expert Method and System Utilizing Quantitative Quality Assurance in Mixed Reality. The implementation described herein is related to a Remote Expert Tool for use in a Mixed Reality Environment, which according to an exemplary embodiment uses a Content Authoring Method and System as disclosed. However, it is to be understood that the scope of this disclosure is not limited to such application.

Initially, described immediately below, is a Creation Authoring Point Tool Utility/Quantitative Quality Assurance For Mixed Reality (See also U.S. Pat. No. 11,062,523 and see U.S. Pat. No. 11,138,805) as applied to the exemplary embodiments disclosed herein. This description provides some fundamental understanding of the Parallel Content Authoring Method and System for Procedural Guidance and Remote Expert Method and System further described below.

Viable mixed reality experiences, where the matching digital domain can be spatially and contextually overlaid within the real world, require known precise positional and dimensional information about objects in the physical environment. Acquiring the digitization of physical objects attributes (e.g., height, width, length) is the first challenge. Context should also be added to these models so that the user can be guided within the mixed reality environment. Once a 3D model exists, in any form, content producers adapt them (e.g., decimate, add context) to provide a key element within mixed reality experiences. These digitized objects along with their context enable operations like step by step instructions for fixing/maintenance of an item or detailing physical object placement within a space.

As operating environments become more complex, the need for objective measures of performance become critically important. Historically, quality assurance of human centric manual production relies on indirect human observation or process driven assurance programs. The subjective nature of quality assurance processes poses significant risk when repair, assembly, or human monitoring are required. A completed assembly or repair that works does not necessarily mean the process was complied with at an acceptable adherence to specification. Traditionally layered human inspection provides a second or third look to ensure the work meets specification. The subjectivity of the traditional process, in general, inserts uncertainty into any process that can transfer into the resulting quality assurance. Subjective quality assurance measures can eventually, and potentially spectacularly, fail to spotlight substandard performance.

Embodiments described herein relate to performing quantitative quality assurance in a mixed reality environment. In the embodiments, subtasks can be associated with human performance bounding, expected actions can be defined, and sensors can be used to add objectivity to metrics. Real time evaluation of indirect and direct measures can include machine learning for observing human performance where no credible performance metrics exist. Immediate feedback based on these metrics can be provided to the user. All appropriate human performance data, object recognitions, task data, etc. can be archived for both task quality assurance and for evaluating human performance. For example, this performance data can be used to perform targeted training or to evaluate performance for excellence awarding.

Figure 1B:
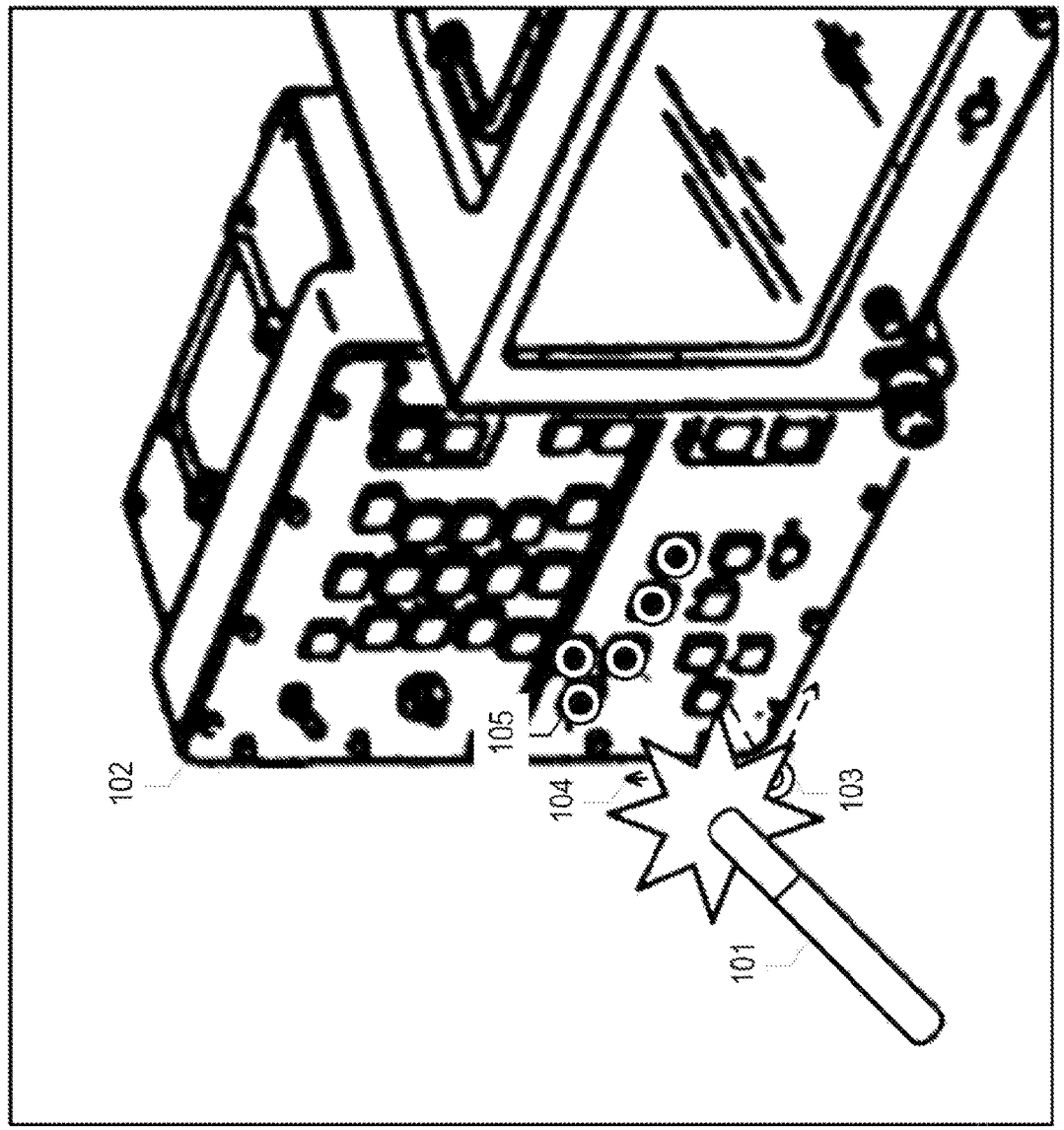
Figure 1C:
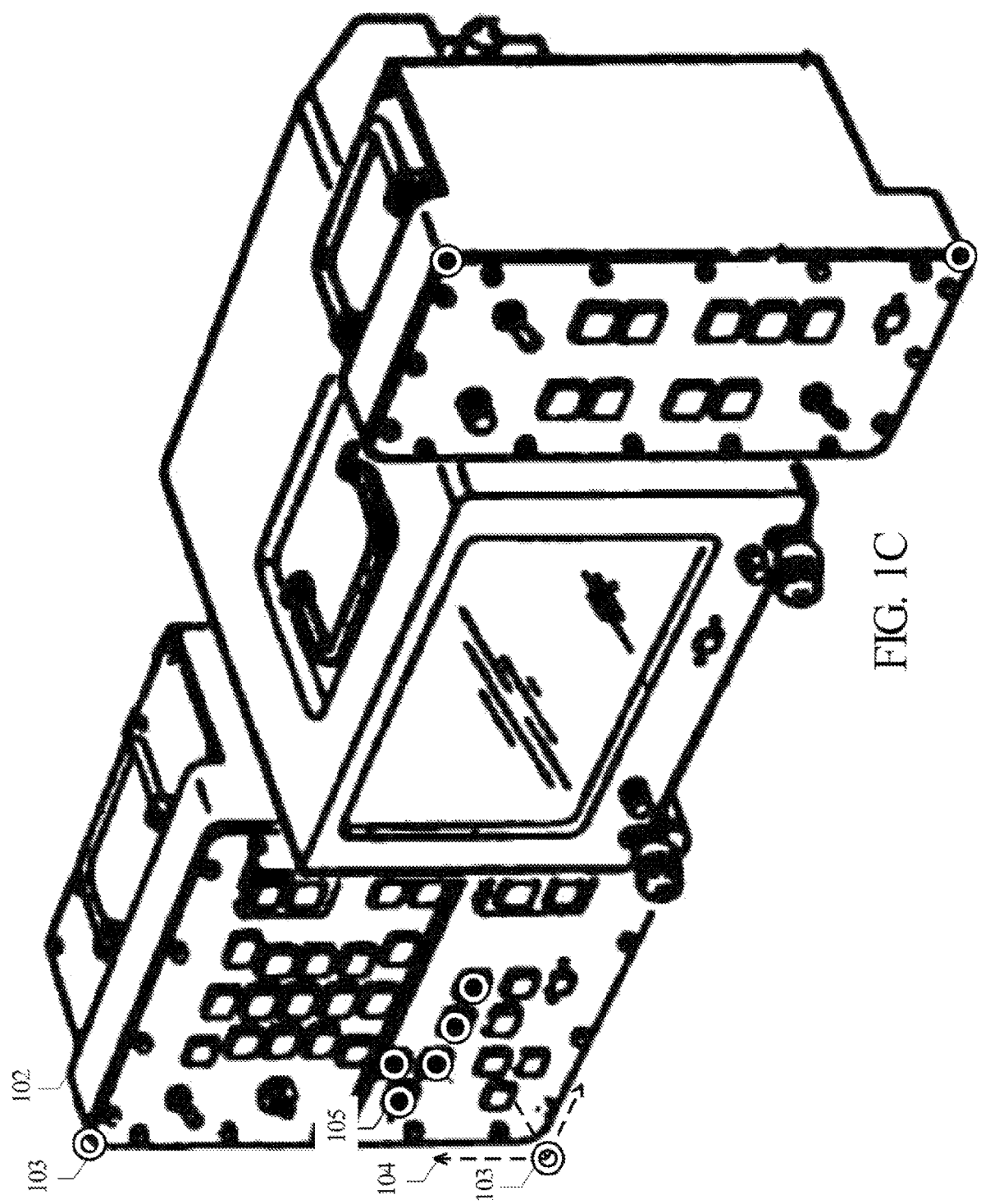

FIGS. 1A-1C illustrate a procedure for collecting positional data for a creation authoring point tool utility. Specifically, each of FIGS. 1A-1C shows the data collection at different stages as it is being used to generate a 3D model of a physical object for use within a mixed reality environment. Various embodiments may not include all the steps described below, may include additional steps, and may sequence the steps differently. Accordingly, the specific arrangement of steps described with respect to FIGS. 1A-1C should not be construed as limiting the scope of the creation authoring point tool utility.

FIG. 1A shows a mixed reality controller 101 that is being wielded by a user (not shown) to define a coordinate system frame of reference 103, 104 for a physical object 102. The mixed reality controller 101 is being used to position the coordinate system frame of reference 103, 104 on a corner of the physical object 102. The coordinate system frame of reference 103, 104 includes an initial object point 103 and three-dimensional directional axes 104. After the mixed reality controller 102 is used to position the initial object point 103, the direction of the three dimensional directional axes 104 can be modified to be in sync with the geometry of the physical object (e.g., aligned with the corner of a box-like physical object 102. The coordinate system frame of reference 103, 104 may be used as a reference point for any additional points specified by the mixed reality controller 101.

FIG. 1B shows the mixed reality controller 101 being used to define an interface element 105 in the mixed reality environment. Specifically, the user uses the mixed reality controller 101 to position the interface element 105 over a corresponding physical interface of the physical object 102. In this example, the user has defined five interface elements 105 that correspond to physical buttons on the physical object 102. Those skilled in the art will appreciate that the mixed reality controller 101 could be used to define any number of interface elements of various interface types (e.g., buttons, levers, switches, dials, etc.). As each interface element 105 is defined, its position is determined with respect to the coordinate system frame of reference 103, 104.

FIG. 1C shows point data specified by the user for a physical object 102. The point data for the physical object 102 includes four object points 103, one of which is a part of the coordinate system frame of reference 103, 104, and five interface elements 1105. Once submitted by the user, the point data can be processed to generate a 3D model (not shown) of the physical object 102. The 3D model can then be used to collect metadata and generate a workflow as described below.

Figure 2:
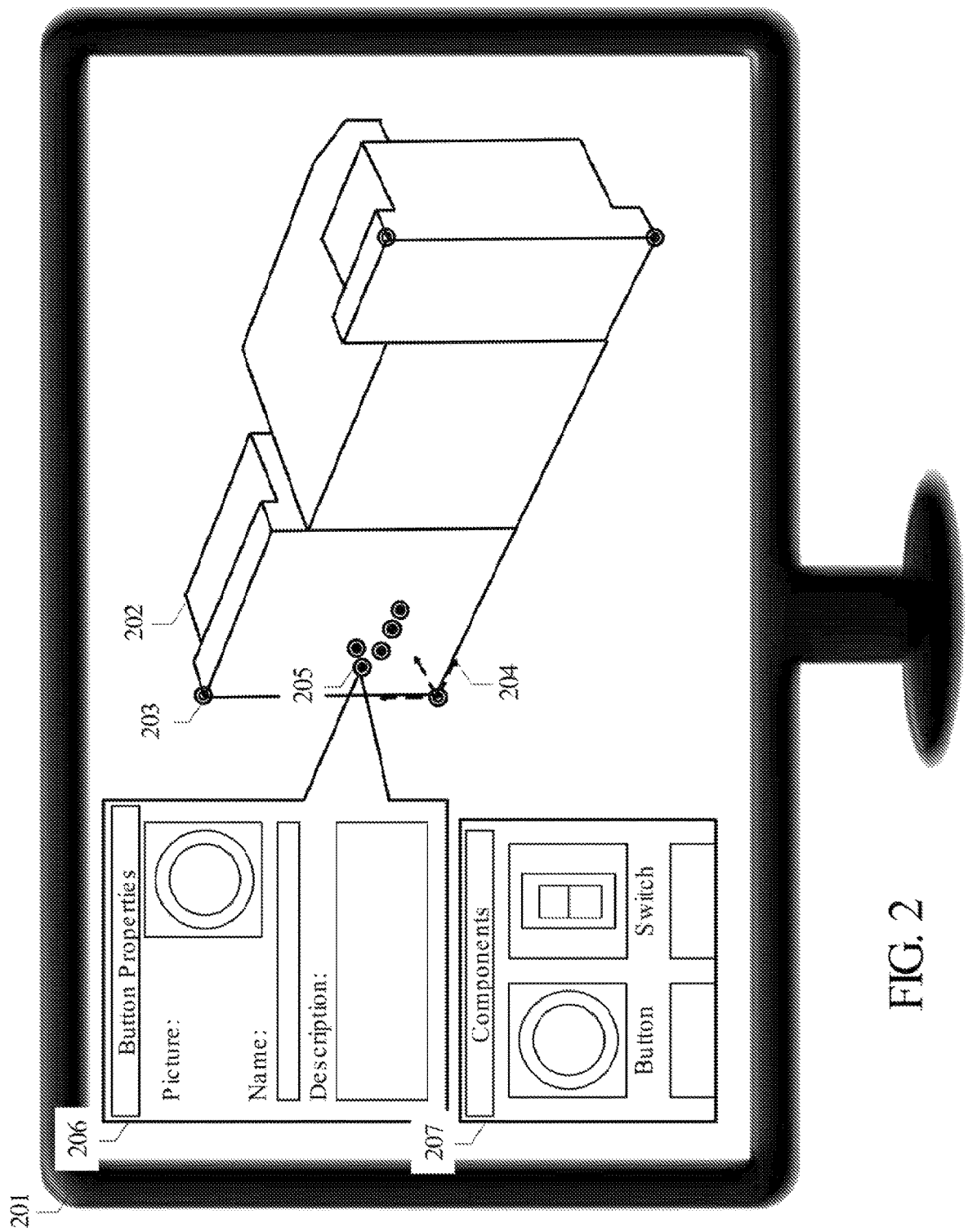
FIG. 2 shows an editor for collecting metadata for a creation authoring point tool utility.

FIG. 2 illustrates an editor 201 for collecting metadata for a creation authoring point tool utility. The editor 201 shows a 3D model 202 of a physical object that includes positional data 203, 204, 205 collected, for example, as described above with respect to FIGS. 2A-2C. The editor 201 allows a user to review the positional data for accuracy and to specify metadata for individual positional points in the 3D model 202.

When the user selects an interface element 205, an interface properties window 206 is displayed. The interface properties window 206 allows the user to specify metadata such as a picture, a name, a description, workflow information, etc. In this manner, the user may select each interface element 205 and specify the corresponding metadata in the interface properties window 206. In some cases, the metadata allows the interface element 205 to be used in workflows that describe how to operate the physical object in a mixed reality environment.

The editor 201 also includes a component type window 207 that allows the user to select the type of each interface element 205. In the example, the user can drag a component type from the window 207 and drop the selected type to a corresponding interface element 205 to set the interface type of the element 205.

The editor 201 can also allow the user to reposition object points 203, three dimensional directional axes 204, and interface elements 205. In this example, the user can reposition the positional data 203, 204, 205 by simply dragging it to a different location. The editor 201 can also allow the user to define workflows with the interface metadata.

In FIG. 2, the editor 201 is implemented as a standard user interface of a user computing device (e.g., laptop computer, desktop computer, tablet computer, etc.). In other embodiments, the editor could be implemented as a virtual interface of a virtual reality computing device. In these other embodiments, the user can interact with the 3D model 302 in a virtual environment interface that is similar to the editor 201.

Figure 3:
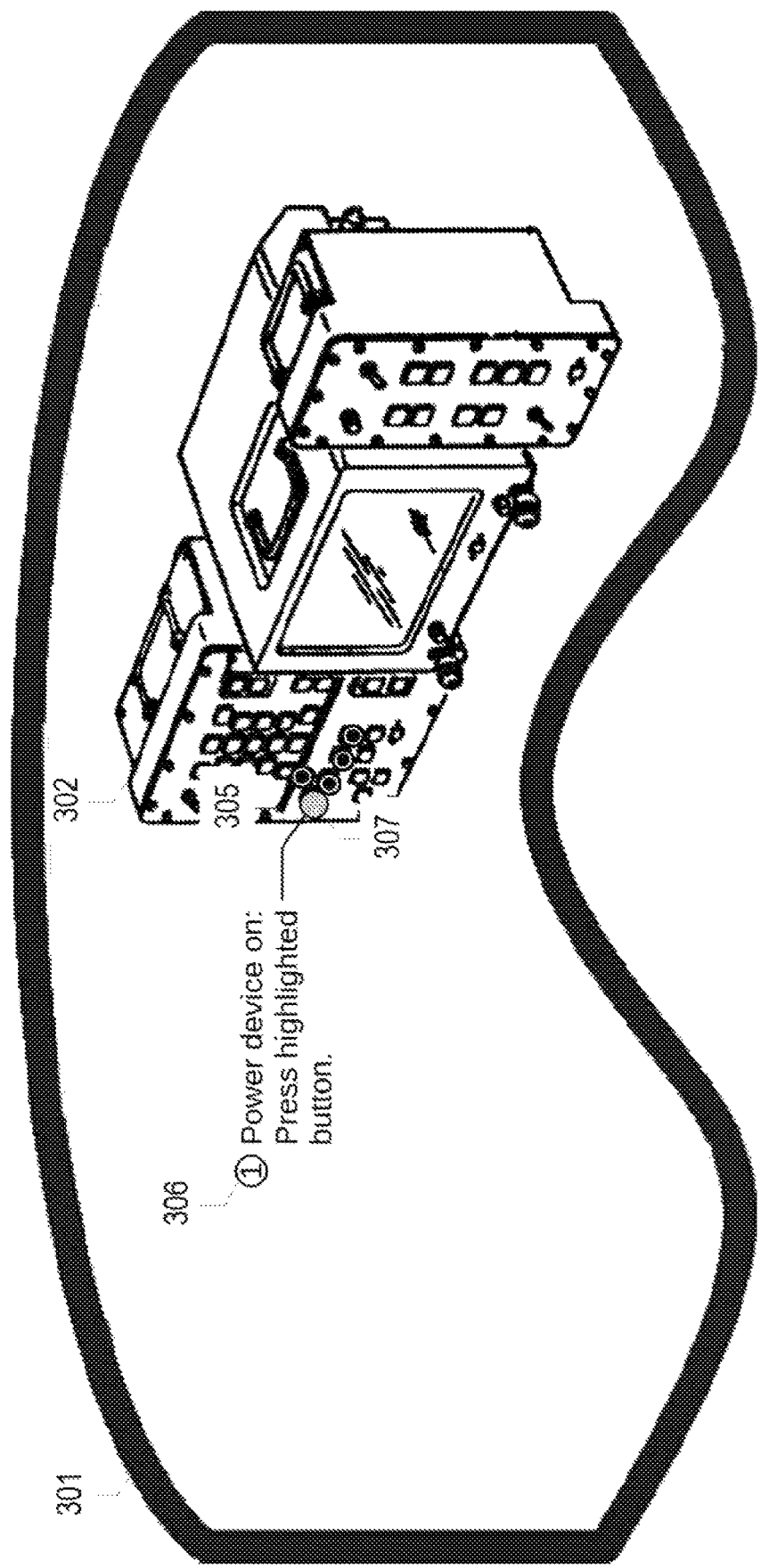
FIG. 3 shows a mixed reality environment as view through a virtual reality headset display.

FIG. 3 shows a mixed reality environment as view through a virtual reality headset display 301. In the display 301, the actual physical object 302 is overlaid with virtual representation of interface elements 305, workflow information 306, and a highlighted element 307. In a mixed reality environment, the overlaid virtual representation follows the physical object 302 as the user changes his view. The workflow information 306 can described an operation that the user should perform using the highlighted element 307.

The user can also use a mixed reality controller (not shown) to navigate through a wizard of the workflow. When the user completes a step of the workflow, he can use the controller to proceed to the next step in the workflow, where the workflow information 306 and highlighted element 307 are updated to provide instructions for the next interface element used in the next step. In this manner, the user can perform each step in the workflow until the workflow is completed. Because the 3D model of the physical object 302 is defined in reference to coordinate system frame of reference that is tied to a position on the physical object 302, the use can be guided through the workflow regardless of the actual location of the physical object 302 (i.e., the workflow guide still operates if the location of the physical object 302 is changed).

Figure 4:
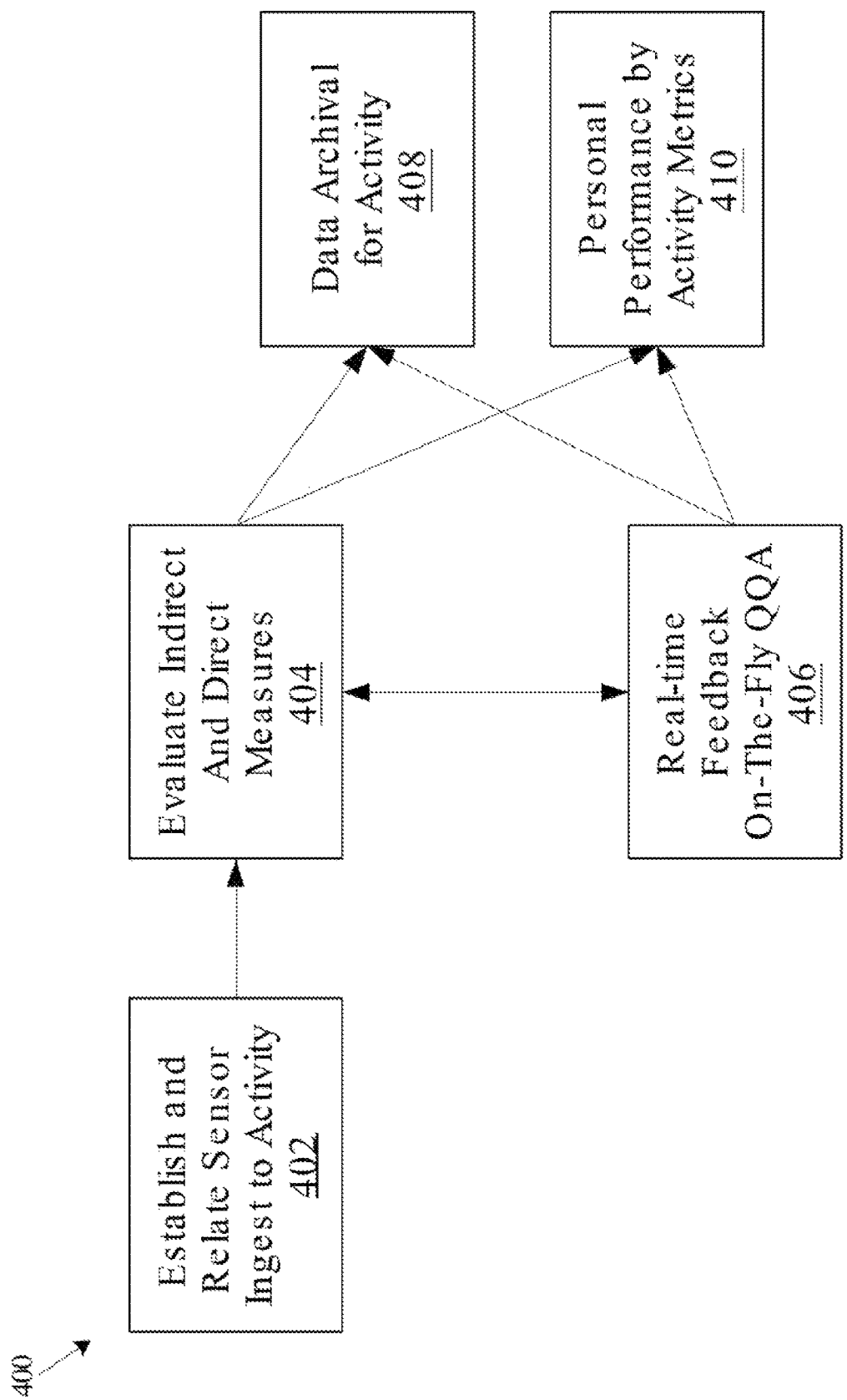
FIG. 4 shows a workflow for quantitative quality assurance in a mixed reality environment.

FIG. 4 shows a flowchart 400 for quantitative quality assurance in a mixed reality environment. As is the case with this and other flowcharts described herein, various embodiments may not include all of the steps described below, may include additional steps, and may sequence the steps differently. Accordingly, the specific arrangement of steps shown in FIG. 4 should not be construed as limiting the scope of quantitative quality assurance.

In block 402, sensor ingest is established and related to subtasks of a workflow. The workflow may include a number of subtasks that a user should perform in a mixed reality environment. Expected actions and performance bounds can be defined for each subtask, where sensor ingests can then be related to the performance bounds of each subtask. For example, a performance bound of a subtask can be the amount of time required for a user to complete the subtask, and the sensor ingest can be defined as the elapsed time until motion sensors in a virtual reality controller determine that the subtask is completed.

In block 404, indirect and direct measures of sensors are evaluated while the user is performing the workflow. As the user is performing subtasks, the virtual environment is aware of the state of the procedure (i.e., what subtask is currently being performed) and relevant movements by the user are being recorded and logged. These movements can be recorded by sensors as indirect and/or direct measures.

Indirect measures are sensing, metrics, and algorithms that feed both real time and archival quality assurance. For example, during an assembly task, indirect measures can include the location of the user's hands, detecting whether the proper hand physical action matches the expected action (e.g., modern phones can detect a 'shake' gesture vs. 'rotation' same logic could be to detect a turning action vs. pulling action with hand), and visual dwell time and focal distance, which can be used as a metric to understand completeness of an assembly task. In this example, an individual looking past an object cannot be inspecting that object for the purposes of completing an action in the workflow. In another example during a repair task, indirect measures can include computer vision that recognizes the new subcomponent, old subcomponent, and the process of removal and replacement. The computer vision of the repair task can be performed regardless of human visual activity (objectively evaluating and documenting actions) or as a comparison to what the human is visually observing (e.g., 1) Why is the user focusing outside the expected work area? 2) Focal distance and sight line in expected parameters for expected dwell time, 3) User cannot monitor work visually due to obstruction). For this example, computer vision of imagery taken from a camera sensor can also process user's hand position. The user's hand position can be relevant to determine whether the subtask is performed correctly by the user. The headset (or sensor) can collect measures related to the location of the subcomponents, the user, the user's hand position, and the current step of the procedure, which are then used to determine an objective confidence score for the current subtask.

Direct measures incorporate feedback from the object or system where actions of the workflow are being performed. For example, a test bench can have a sensor to detect that a connection has been made with a wire. Other examples of direct measures include detectors or sensors for network connectivity, temperature, pressure, voltage, etc. In another example for network connectivity, the connector itself can be the sensor validator (i.e., the act of the connection with the connector becomes the validation).

In block 406, real-time feedback of quantitative quality assurance is provided to the user. For example, after the user completes a subtask in the workflow, a confidence score can be displayed for the user to show how well (e.g., compliance, speed, accuracy, etc.) the user performed. The confidence score can be determined based on the indirect and direct measures as described above in block 404.

In block 408, data metrics for the subtask's performance are archived. For example, the indirect and direct measurements along with the resulting confidence value can be stored in a database. These data metrics can be used to, for example, gauge the effectiveness of training, develop modifications to the workflow, etc.

In block 410, the personal performance of the user can be determined by the data metrics. For example, a report can be generated for the user that shows the confidence value for each subtask along with an overall grade to assess the completion of the workflow. Tracking the personal performance of the user can be used to build a personal profile that encourages the user to improve his performance in completing the workflow, assess the job performance of the user, etc.

Figure 5:
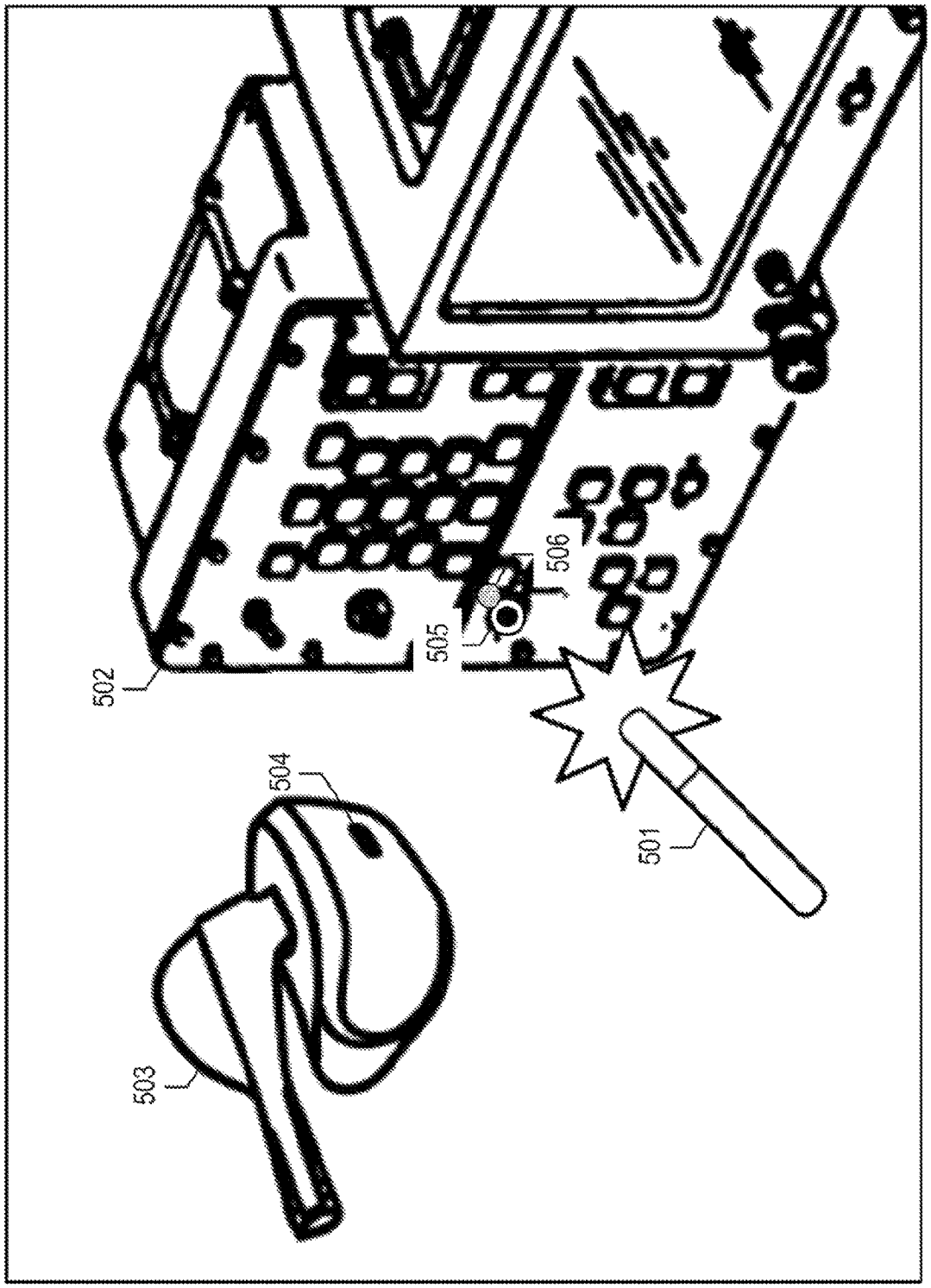
FIG. 5 illustrates quantitative quality assurance being performed in a mixed reality environment.

FIG. 5 illustrates quantitative quality assurance being performed in a mixed reality environment. A user's virtual headset 503 and virtual controller 501 are shown interacting with a piece of equipment 502. The user is working on a current subtask that involves a physical interface that is highlighted 505 in the mixed reality environment. As the user completes the current subtask, indirect and direct measurements are collected by the headset (camera/sensor set information—indirect: pose, hand position/movement relative to the user and workspace/object, user location relative to workspace/object, etc. vs. direct: computer vision identification of correct parts for example), 504 and the virtual controller 501, and direct measurements are collected by an interface sensor 506. The interface sensor 506 detects when the user interacts (e.g., flips a switch, pushes a button, completes a connection, etc.) with the physical interface, which is interpreted in the mixed reality environment as completion of the subtask. When the subtask is completed, the collected indirect and direct measurements can be used to determine a confidence value, which can be presented to the user on the virtual headset 503.

Parallel Content Authoring Method and System for Procedural Guidance.

Humans have effectively communicated procedural activity individually and at scale in two-dimensional (2D) instructions (digital, printed, or etched) for thousands of years. This pathway is suboptimal due to an assortment of factors, one of which is the double translation error of 3D actions into words or pictures from both the designer and the worker. Also, we naturally interact with our 3D environment in 3D. Instructions without translation errors maintaining their native domain reduce communication friction and misinterpretation presented with words and abstracted diagrams. Over the last 140 years, our ability to describe or present information has evolved far beyond a static 2D representation. Spatiotemporal continuity afforded by animation (I.e., film) is one evolution. For example, in a single continuous shot, a 3D scene is slowly revealed, enriching our understanding of a physical space. When a medium provides spatiotemporal enrichment, we refer to it as two and a half (2.5D), resulting in an enhanced 3D physical space awareness.

"YouTube"-style limited context ('flat') videos are ubiquitous for general population task preparation and knowledge transfer. Increasingly, stakeholders are requesting a better medium to transport and deploy knowledge in addition or in lieu of traditional text or hyperlinked documents. This is an admission of the failure of text and hyperlinked flat documentation to transfer 3D instructions that require a spatial understanding to complete. Viewing tasks performed through 2.5D projection provides an improvement over text. Mixed reality (augmented reality (AR) and virtual reality (VR)) are even more advantaged in this regard removing any medium translation by ensuring 3D tasks remain in 3D where 2.5D is still bound to medium translation and merely a temporal 2D representation.

Figure 6:
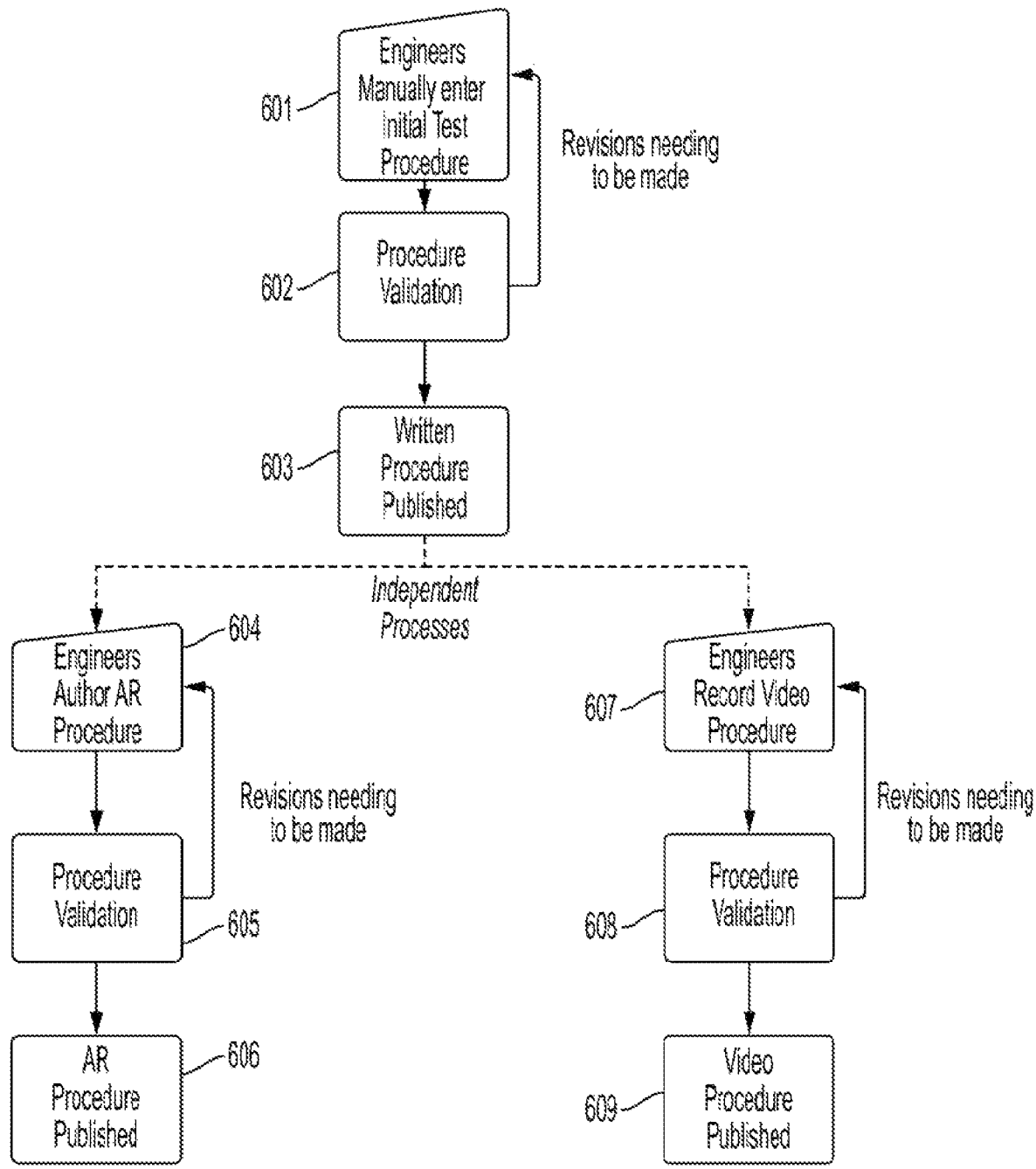
FIG. 6 shows a process for developing a procedure and converting that information into an augmented reality (AR) instruction and/or "YouTube" video instructions.

Currently, workflows for authoring content for a medium (e.g., augmented reality, paper, video, digital 2D document) that depicts 2D, 2.5D, or 3D information are independent of one another (FIG. 6 shows a process for developing a procedure and converting that information into an augmented reality (AR) instruction and/or "YouTube" video instructions.) For example, an engineer generates 2D instructions through software (e.g., an XML writer or word processing software), as a text document (e.g., digital or printed) remaining in that format for various purposes. 601, 602, 603 To translate that into another format (e.g., AR, video), a separate evolution creates content based on the original information, for example AR 604, 605, and 606; and video 607, 608 and 609. An array of problems emerges when attempting to scale this process. A prime growth and adoption inhibitor for 2.5D and 3D medium translation of the current process is unscalable resource demands. Another underlying driver for traditional 2D creation (e.g., word/text and diagram instructions) is current policies/processes require it and stakeholders recognize the increased resources 2.5D and 3D mediums demand.

Other limitations of the current process that affect scalability include: 1) Each written/authored procedure must be individually validated; 2) Keeping version control and making sure everything is 'up to date' with the wide array of formats is challenging. In the current process, changes would have to be manually cascaded and managed per instruction procedure. Meaning, once the original (usually 2D text document) is changed, another separate effort must be taken to alter and keep other content mediums up to date and correspond with each other (e.g., film a new video corresponding with the procedure); and 3) further, all these formats and files produced per procedure most be transmitted, stored, and managed.

Figure 7:
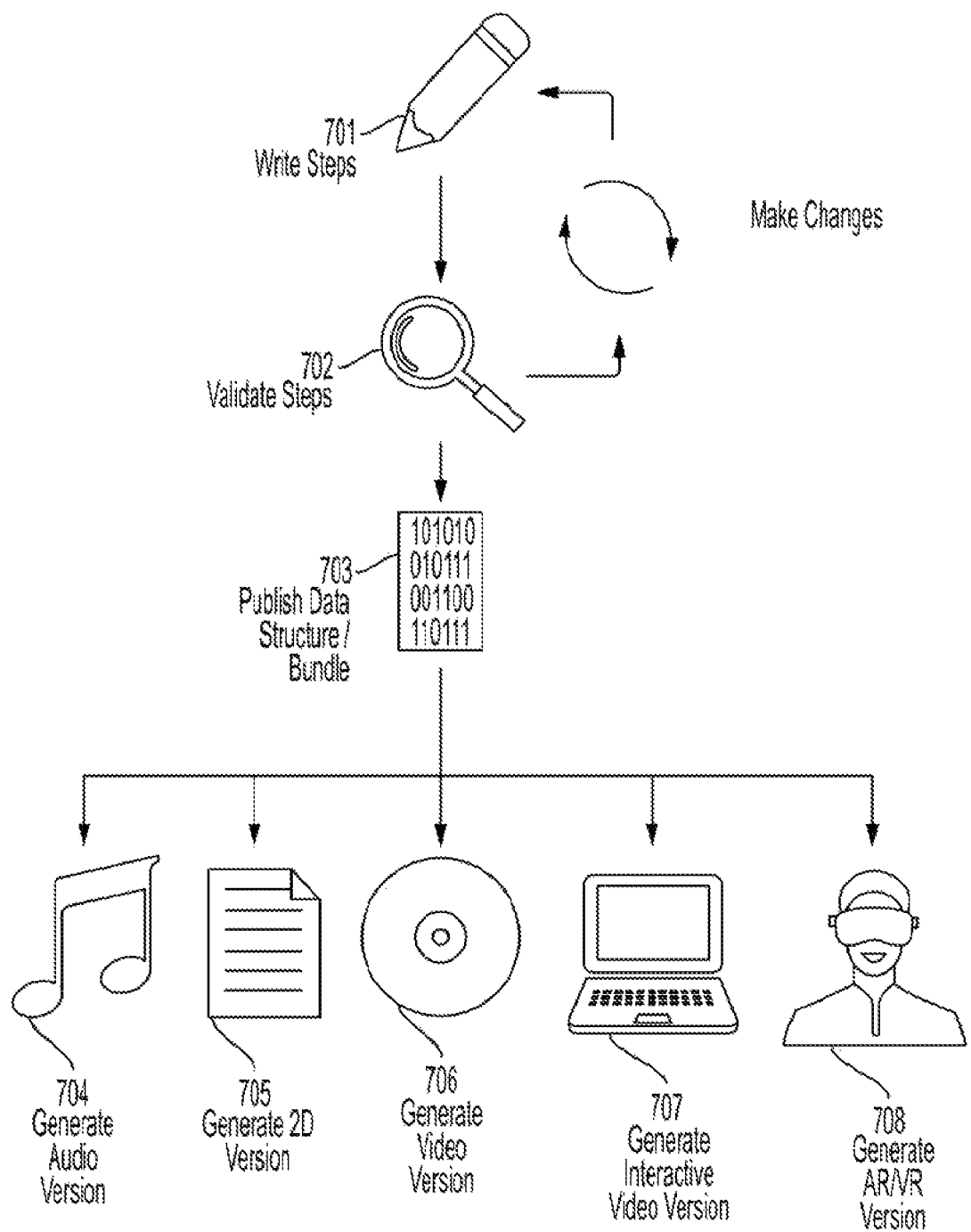
FIG. 7 is a high level process diagram showing a process for developing an instruction set (e.g., queued annotations) that can be viewed in different modalities, according to an exemplary embodiment of this disclosure.

With reference to FIG. 7 shown is a high level process diagram showing a process for developing an instruction set (e.g., queued annotations) that can be viewed in different modalities, according to an exemplary embodiment of this disclosure. This process including writing steps 701, validation steps 702 and a published data structure/bundle 703. FIG. 7 demonstrates a procedural authoring system to store bundled information in a medium that can be directly and automatically translated into all derivative mediums (2D, 2.5D, or 3D) 703 or translated into individual formats (e.g., PDF or .MP4) 704, 705, 706, 707 and 708. The bundle (or individual format) is easily distributed as needed at scale. By this method, for example, a 2D PDF file could be produced and used on its own or a 2D application could be created (e.g., showing text, images, and video) with an AR companion application (where they are able to be synchronized together), or a video could be made by itself. The original data bundle could be parsed later to create any derivative form either as a stand-alone or as a combination of end mediums (2D, 2.5D, 3D). Different approaches could be done to execute the experience on the end medium, for a non-limiting example, by having all the necessary information to run the procedure in bundle (e.g., code, model information, procedure information, other data), or having an end device contain a subset of that information already (e.g., model information, application to run procedure) and sending the updated procedure.

The current leading mindset translating content into a new medium is to run an application after the original documentation is established. That application would then parse the written (e.g., PDF, XML) documentation, matching words with parts and positions (creating structure linking words with objects post 2D source document creation), and generate other forms of AR content (e.g., linked "smart" diagrams, showing information step by step text information in AR). The described concept has structure in the authoring. The prior art depends on parsing human language (e.g., French, English) which migrates over time and has problems translating between languages, where the new art depends more on math (e.g., defining objects, coordinate systems, positions, rotations, translations/paths, state of the system) and is language agnostic, meaning it can translate between language easier (math is the universal language) by using language grammar rules for a given language. Of note, this prior art only discusses single translation paths vice simultaneous translations paths with multiple outputs. Three impactful drivers explain the non-scalability of single translation path method.

1) Most "2D" documentation/instructions do not keep track or label the positions of items in 3D space. When 3D AR or VR content is being created, the author must know 'where' to put the spatial content in relationship to the system (e.g., where a particular button is on a machine). Since 3D spatial information (meaningful to AR or VR applications) is not stored in traditional 2D documentation, it would have to be recovered from a CAD model (manually through an algorithm, or through an undefined process) or manually recreated from the original object.

2) Documentation is not reliability standardized sufficiently for a parsing application to generate/parse a wide range of publications. Further, Individual authors will describe processes and items differently according to their own style and preference. This means specialized parsers would have to be created. This could even be the case where tasks are effectively identical but stored within proprietary formats (e.g., Toyota vs. Ford documentation to change a tire).

3) Every time a change is made in the original procedure, derivative mediums based on that procedure would require another parsing, revalidation, and distribution. This overhead impedes the scalability of the current process and increases the likelihood of mismatching documentation.

Figure 8:
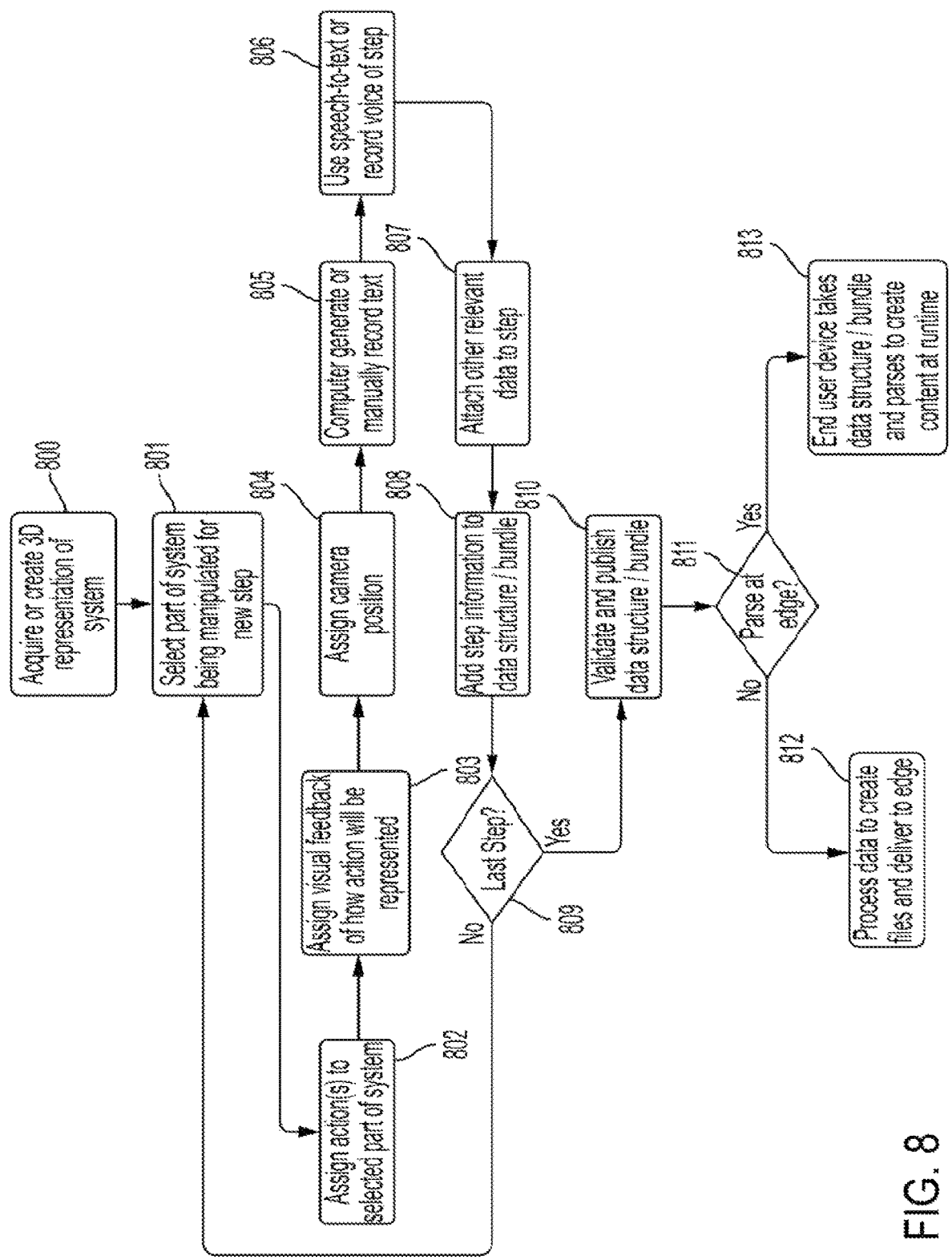
FIG. 8 shows an example workflow for Parallel Content Authoring according to an exemplary embodiment of this disclosure.

There are multiple forms that one could take to create the end result of this process. FIG. 8 shows an example workflow for Parallel Content Authoring according to an exemplary embodiment of this disclosure.

The process flow in FIG. 8 shows one potential route for generating the information required for to display the information in multiple modalities. Each portion of information that can be entered (e.g., position, text) represent modules. For other relevant data, pointed out in step 807, other modules of information can be added to the data structure in the future that will allow it to evolve with technology over time. A subset of modules in FIG. 8, for example, position along with other relevant data (e.g., corrosion type as shown in 13) can be used for documentation about a system and are inline with the Parallel Authoring concept. Regardless, the described approach authors structure (linking words and objects described in 3D) in the source documentation and modules described can both be considered optional (because some information like camera position can be calculated using other modules and/or may not be necessary for a given implementation) as well as non-limiting.

1) (800) Acquire or create a necessary 3D representation of a system to execute the desired procedure (creation of 3D representation can be performed during authoring). The 3D model can be acquired in different ways such as ingesting CAD data, hand modeling using Blender or Autodesk, in situ hand modeling (such as using individual points of interest (see Creation Authoring Point Tool Utility to Recreate Equipment (U.S. Pat. No. 11,062,523) and discussion above)), or in situ procedural modeling such as photogrammetry or simultaneous localization and mapping. For any procedure, only a subset of 3D position information of the system needs to be known (except in the simplest of systems) additional representations of a systems may help an end user better understand the spatial environment where the task takes place. The creation of the 3D representation may either be done before or during the authoring process. For the latter, the author(s) can be in front of the actual physical system and using mixed reality to facilitate recording of the procedure. This could be done by defining a point in an object's coordinate space and later replacing that with a more fully formed model). Of note, this can be a collaborative process with multiple authors. For example, one author can be in mixed reality marking objects in 3D space while the second author is on a PC putting in other details.

Figure 12:
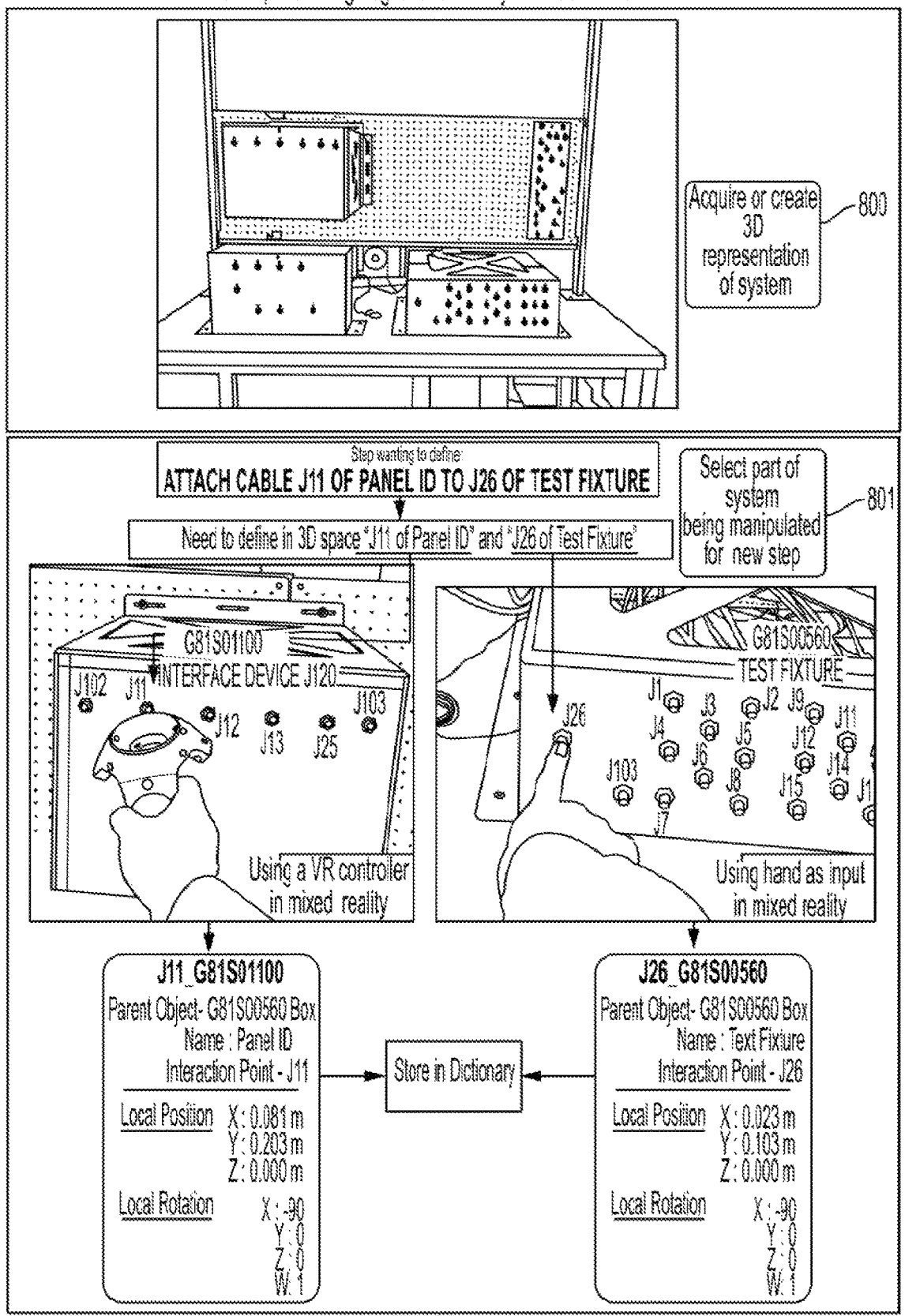
FIG. 12 shows an example of information collected in mixed reality being used to create a 3D representation of the system, where positions of points are stored and used in the creation of instructions (e.g., queued annotations) according to an exemplary embodiment of this disclosure.

2) (801) (The author(s) selects the part of the system needing to be altered either on a computer (e.g., clicking a mouse on a part of a 3D model, clicking a controller in VR on a specific part of a 3D model), alternatively selecting, or defining the part on the actual physical system using mixed reality. That specific object has a known 3D location to a defined coordinate system for the model. FIG. 12 shows two examples of this in mixed reality.

3) (802) Individual action(s) in a step are assigned (e.g., 'turn') to the selected object (e.g., 'left lever'). That process may be manually selected (e.g., selecting 'turn' from a drop-down menu on a computer screen) or the physical action on the real system is detected using mixed reality and applicable sensors (e.g., understanding that the author's hand is on the left lever and detecting through computer vision that the lever is turned).

4) (803) In non-limiting examples, Aa marker, animation, or some way to signify the action showing where the task needs to be performed is generated (important for 3D, and 2.5D video outputs).

5) (804) A camera (virtual or real) position is manually recorded or dynamically generated (either at the time the procedure is authored or calculated at runtime when procedure is executed) based on the type of task and location of the object (important for the 2D pictures or 2.5D video output).

6) (805) A text description of the step can be either computer-generated or manually created. In non-limiting examples of how this could be done an application could process the data structure and creating a template sentence (filling in words in a "mad-lib" style (FIG. 10)), using words to fill in a sentence structure (subject, verb, object for example) (FIG. 15), or processing the animation of an object in context to the step to derive a sentence. Processing could also be done on the text to format it in a way that a person executing would be understand it (e.g., language localization, word style preferences). These computer-generated text description examples could be done during the authoring (i.e., a full sentence published in the instruction), or generated at runtime by the program running the procedure file.

7) (806) A sound file is computer-generated containing the description of the step based on the individual action and specific object. Alternatively, an audio recording could be made where the author records a voice-over for the step and assigned to it. For the former, text-to-speech could be done by the end application processing the text description described previously.

8) (807 and 808) Other non-limiting relevant data or modules are attached to the step (e.g., real-life pictures, screenshots from the virtual camera, qualitative quality assurance expected sensor readings (see Qualitative quality assurance for mixed reality (See Quantitative Quality Assurance for Mixed Reality U.S. Pat. No. 11,138,805 and discussion above), training data such as xAPI information, code, a neural network or algorithm for validation, or haptic information) or is placed in between action steps as its own step.

9) (809) Steps 2-8 are repeated to complete the procedure being created or modified.

10)(810) Once the procedure goes through a user-defined validation process (i.e., inside, or outside of the program) it is ready to be delivered. That delivery (111) can take the form of a bundle of data (that the end user's application can parse and run) (113) or individual outputs (e.g., text, AR instructions, video) can be created and delivered (112).

Now provided are further details of some of the features and aspects of this disclosure related to a Parallel Content Authoring Method and System for Procedural Guidance.

Figure 9:
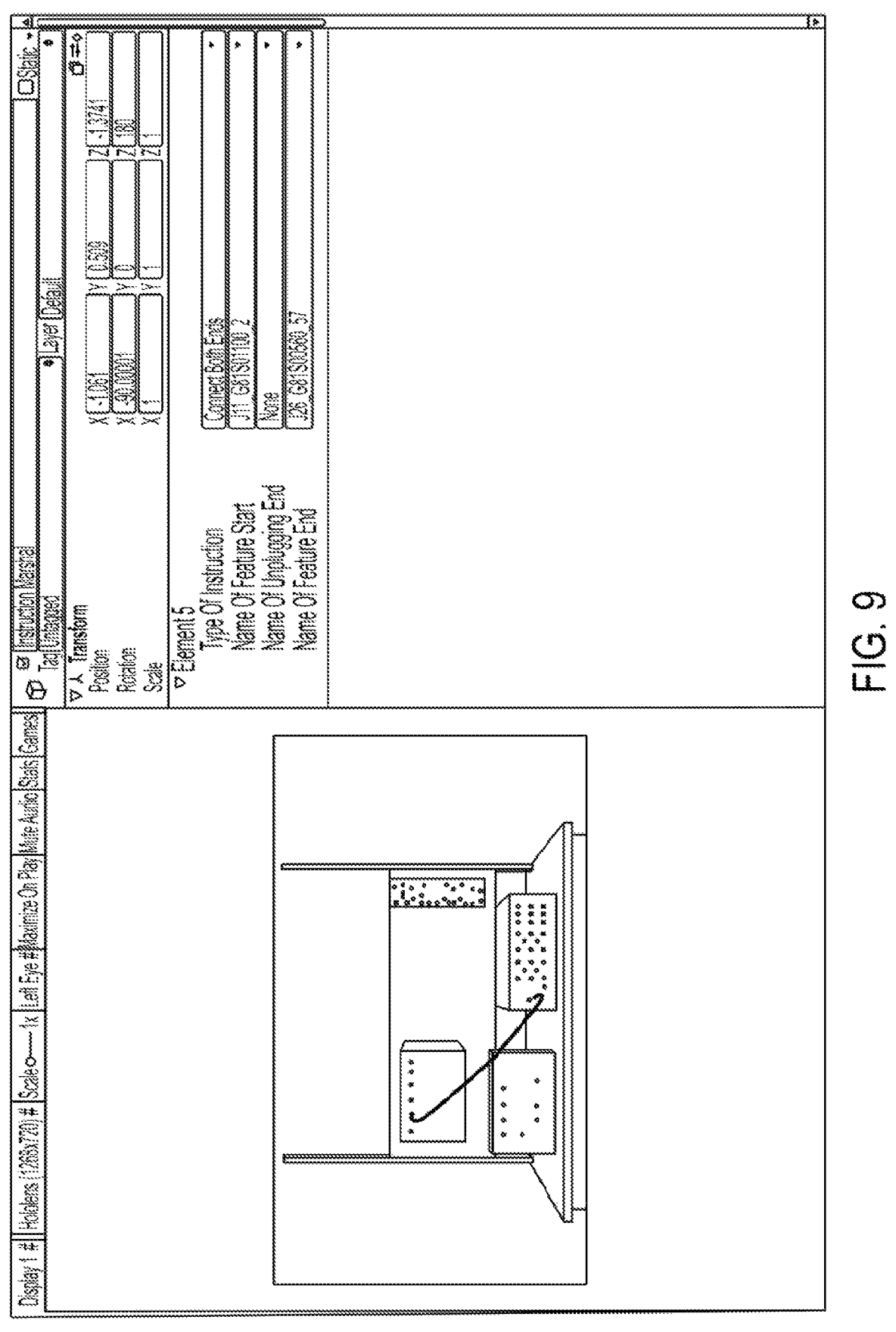

With reference to FIG. 9, shown is a variation of an application editor geared towards plugging wires into boxes (J11 in Panel G81S01100 "ID Panel" to J26 in panel G81S00560 the "Test Fixture" shown). The editor, in this specific case, generates a procedural wire going from the feature start point (J11 in Panel G81S01100) to the end point (J26 in panel G81S00560). Showing dynamic modeling can help validate to the author that the step is described correctly.

Figure 10:
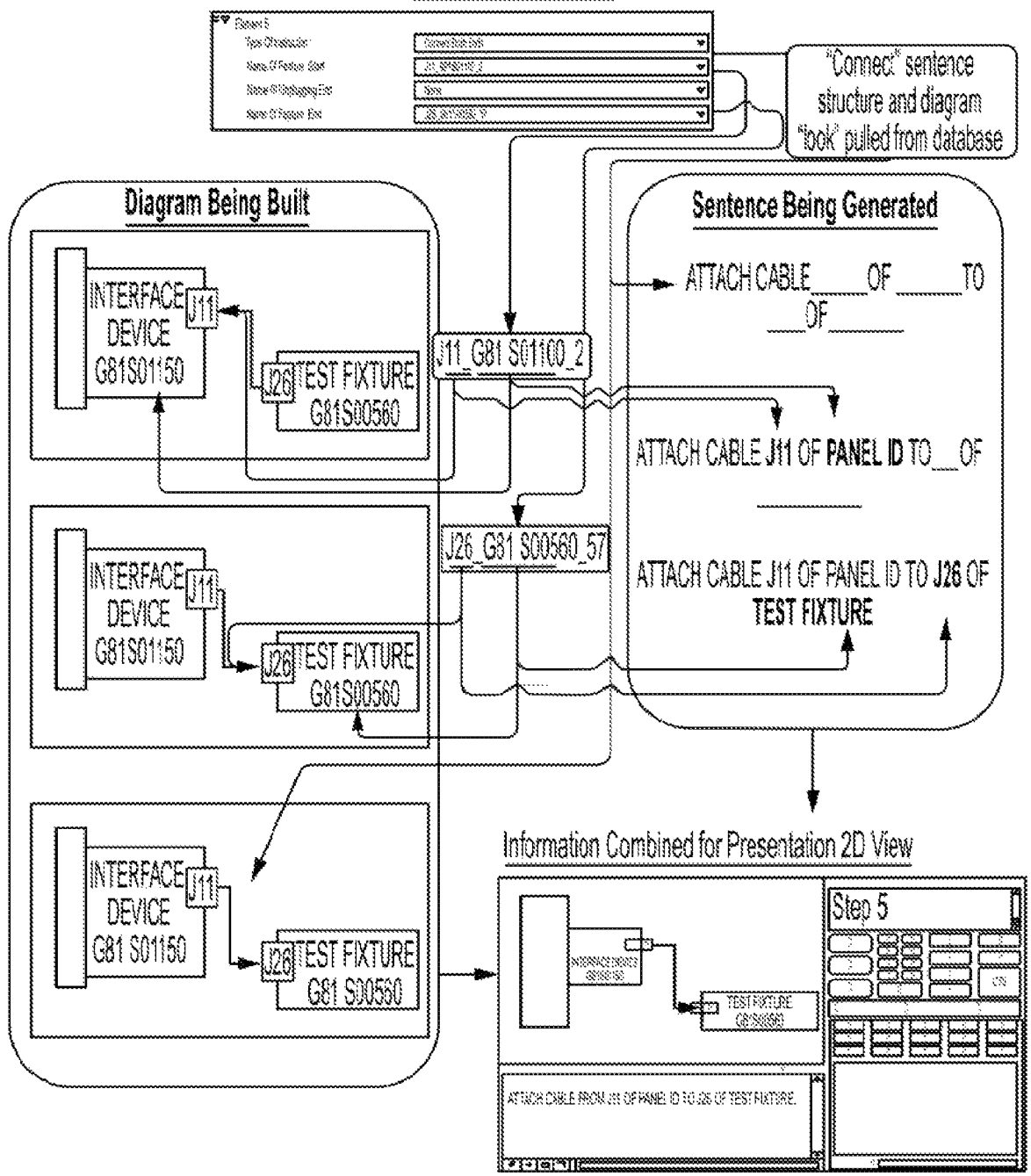
FIG. 10 expands on FIG. 9 to shows a common data structure being used to generate multiple forms of 2D data (a 2D diagram on the left and a sentence on the right).

With reference to FIG. 10, shown are further details of FIG. 9 to shows a common data structure being used to generate multiple forms of 2D data (a 2D diagram on the left and a sentence on the right). In the example instruction, the type of connection is known ("Connect Both Ends") along with the start and end points, with this information a look up could be done on the symbology needing to generate a 2D diagram and a type of sentence needing to be written.

Figure 11:
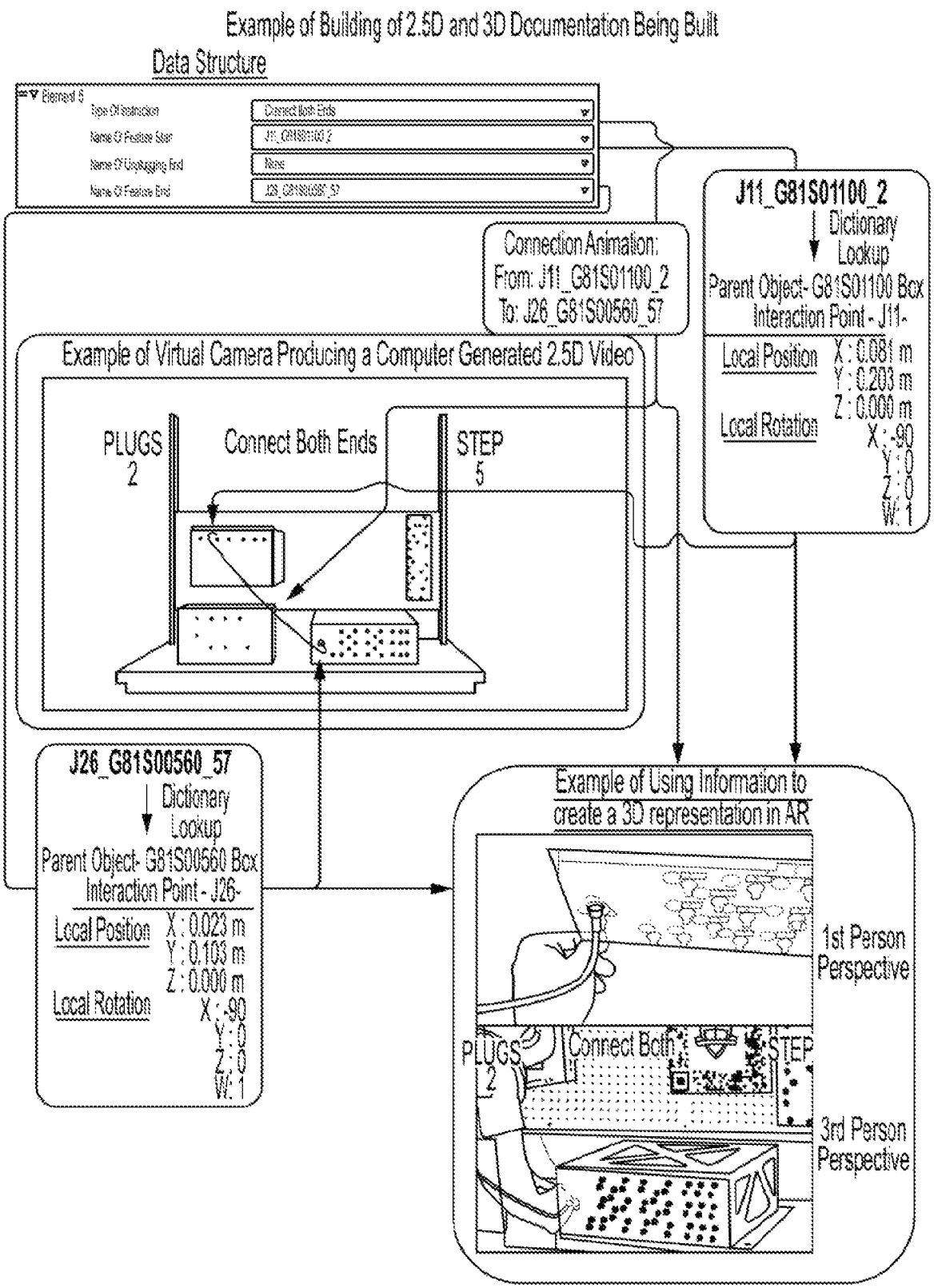
FIG. 11 shows the common data structure authored in FIG. 9 being used to generate a 2.5D computer generated video and a 3D experience using augmented reality according to an exemplary embodiment of this disclosure.

With reference to FIG. 11, shown is a common data structure authored in FIG. 9 and being used to generate a 2.5D computer generated video and a 3D experience using augmented reality. For the example, the positions of J11 and J26 are both known and the "connect both sides" describes the visualization that needs to occur and can be generated programmatically between the two points. The information is able to be viewed different ways, in one through a virtual camera for the 2.5D video (which was authored in the step) and in an optical-see-through AR example, the head position is the camera position for the virtual environment (the position of the virtual camera in the step was not necessary and discarded).

With reference to FIG. 12, shown is an example of information collected in a mixed reality environment being used to create a 3D representation of the system, where positions of points are stored and used in the creation of instructions (e.g., queued annotations) according to an exemplary embodiment of this disclosure.

Figure 13:
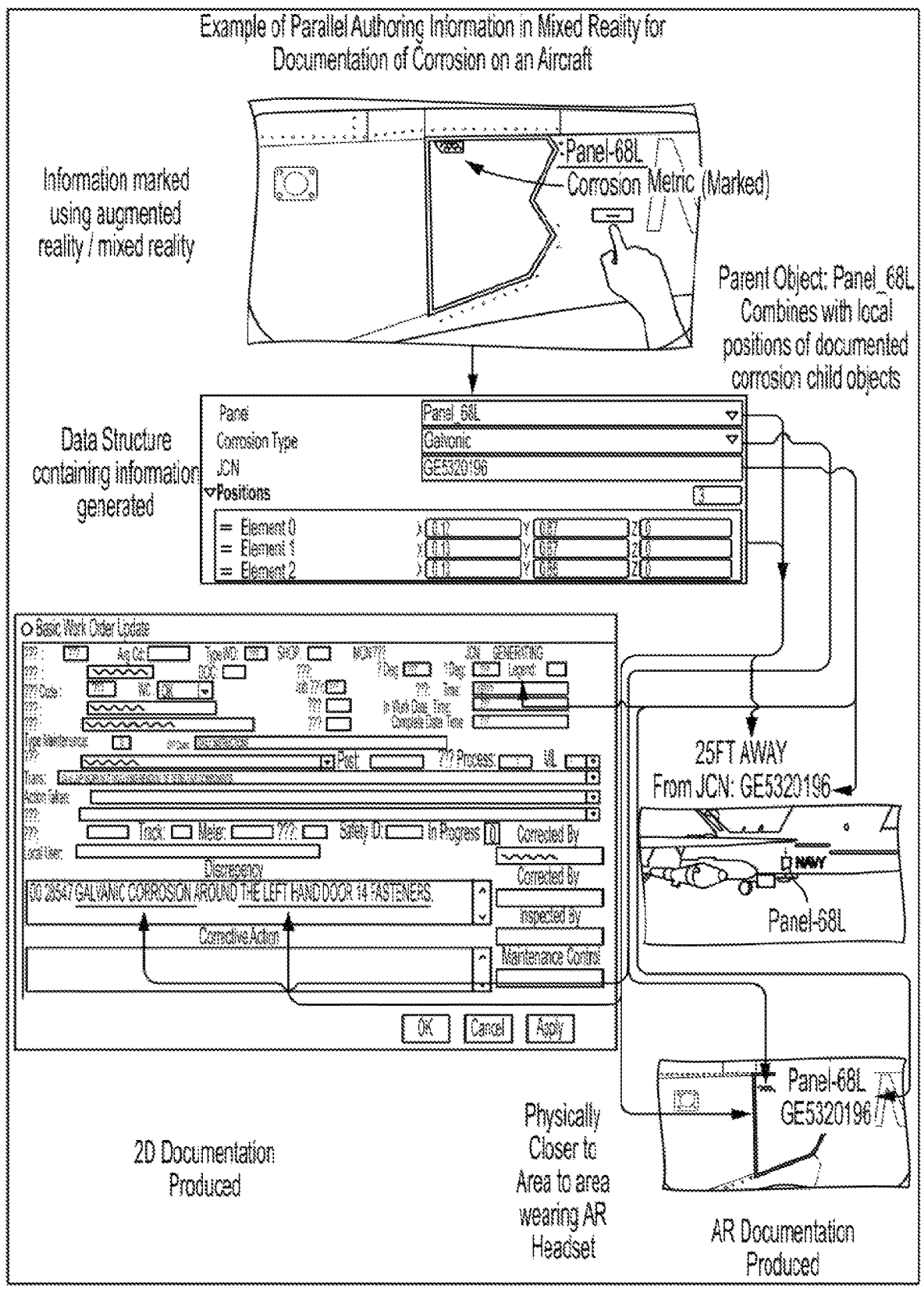
FIG. 13 shows an example of information collected in mixed reality creating a data structure that is used to parallel author multiple outputs, in this case 2D and AR presentations for corrosion information according to an exemplary embodiment of this disclosure.

With reference to FIGS. 13, shown is an example of information collected in a mixed reality environment creating a data structure that is used to parallel author multiple outputs, in this case 2D and AR presentations for corrosion information according to an exemplary embodiment of this disclosure. In the example, it shows how a subset of modules (e.g., position, corrosion type, and job control number (JCN), while leaving out others like virtual camera position) can be used to describe the necessary information but action for the maintainer (e.g., how to repair it) are left out. The embodiment shows that this process works for parallel authored documentation. Of note, when using sensors, it is possible to put that information procedurally into a data structure instead of relying on human input. For an example, the sensor can detect the corrosion through computer vision, understand where it is occurring in 3D space and document it in a parallel authoring data structure.

For example, as shown in FIG. 13, "documentation" such as a Basic Work Order includes information indicating work to be performed on a particular part/system, including sentences describing, for example, corrosion location on an aircraft. Then a recording process can be used to record a visual indication of the work to be completed in 3D, which can then be recreated as 2D documentation (because it is known where on the aircraft something is) and use this information it create a new 3D viewing of the information (AR Documentation Produced). Details about tasks to be performed, for example a repair, can then be authored and included.

With reference to FIGS. 14, shown is an example of having an interaction between a 2D application and an AR companion application utilizing a common data structure according to an exemplary embodiment of this disclosure. There are different approaches that can be performed to achieved this (in the example, the 2D version sending a message to the AR version with the data structure contained), but the main desire is for both to be reading the same state of information (i.e., single source of truth).

Figure 15:
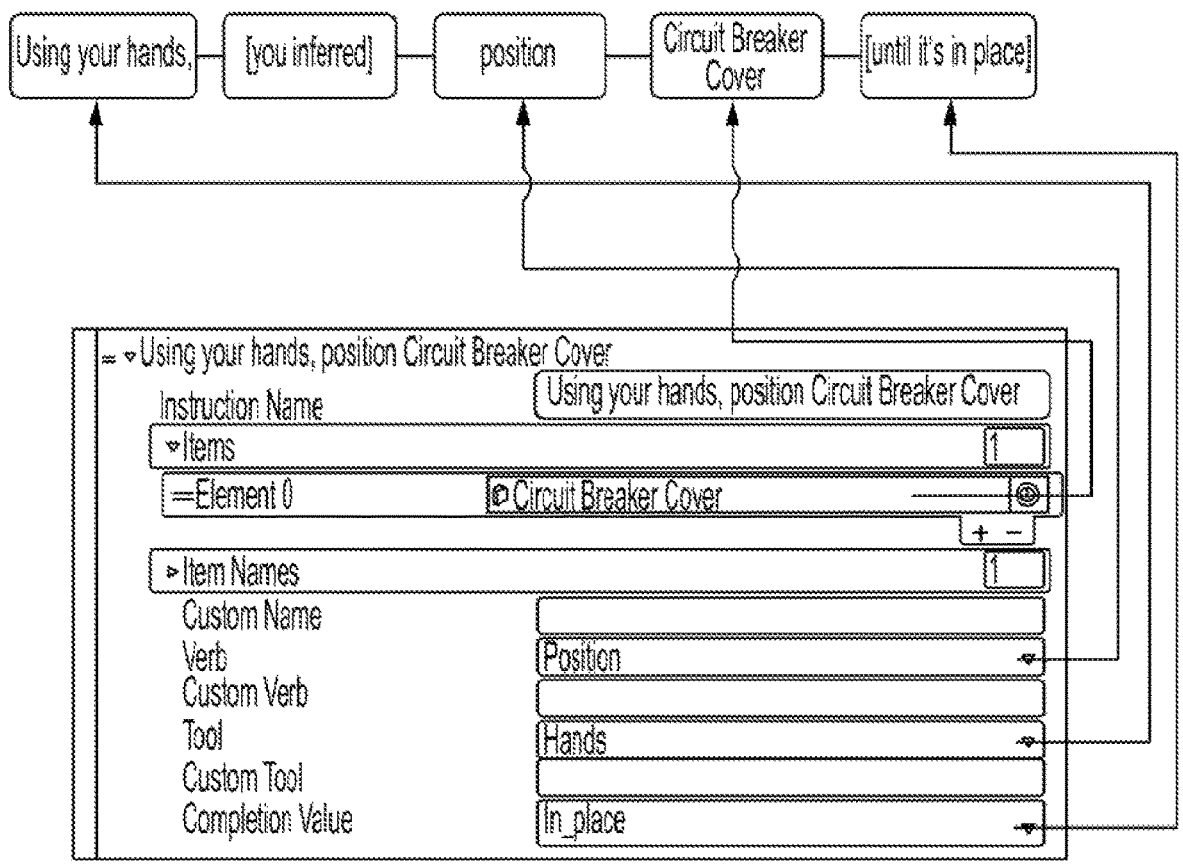
FIG. 15 shows an example of the basics of a sentence (subject, verb, object) being incorporated into a data structure and arranged to create a sentence. In the example, the pieces put together create a full sentence which can be extendable to translate into any language.

With reference to FIG. 15, shown is an example of the basics of a sentence (subject, verb, object) being incorporated into a data structure and arranged to create a sentence. In the example, the pieces put together create a full sentence which can be extendable to translate into any language.

Figure 16:
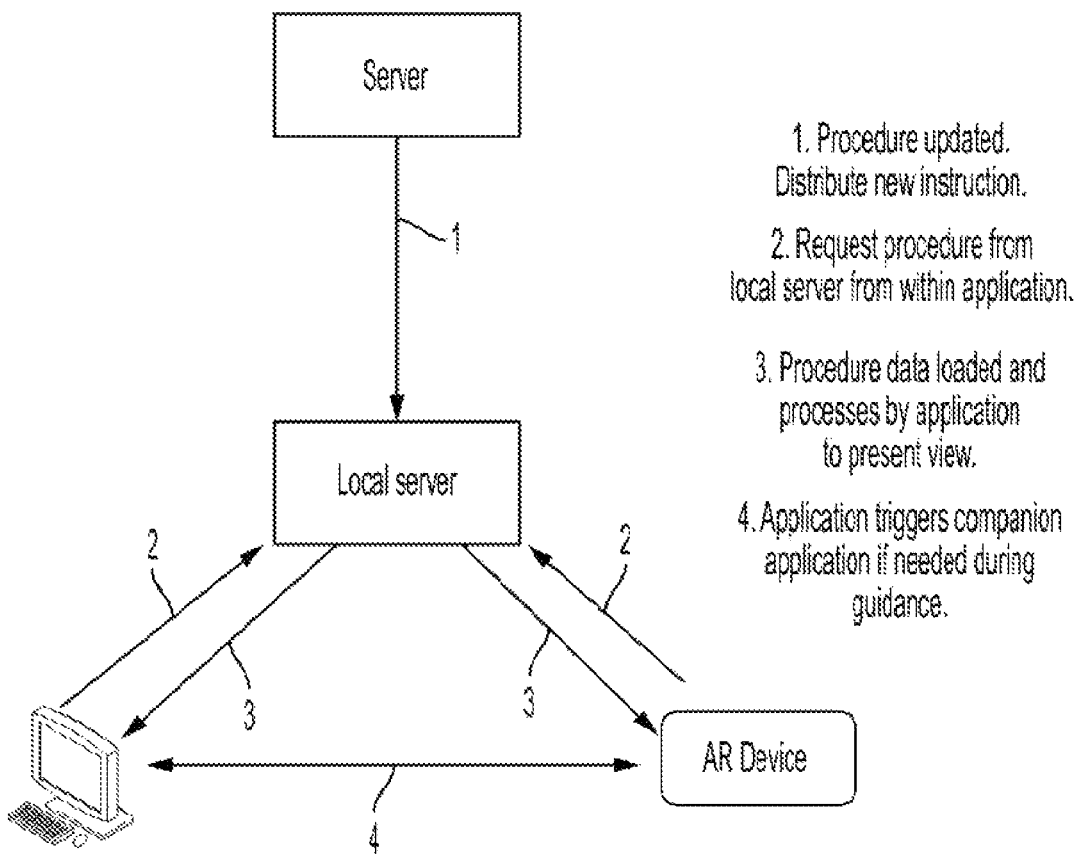
FIG. 16 shows an example of a procedure being loaded at runtime by an application and processed to show a specific view according to an exemplary embodiment of this disclosure.
Figure 17:
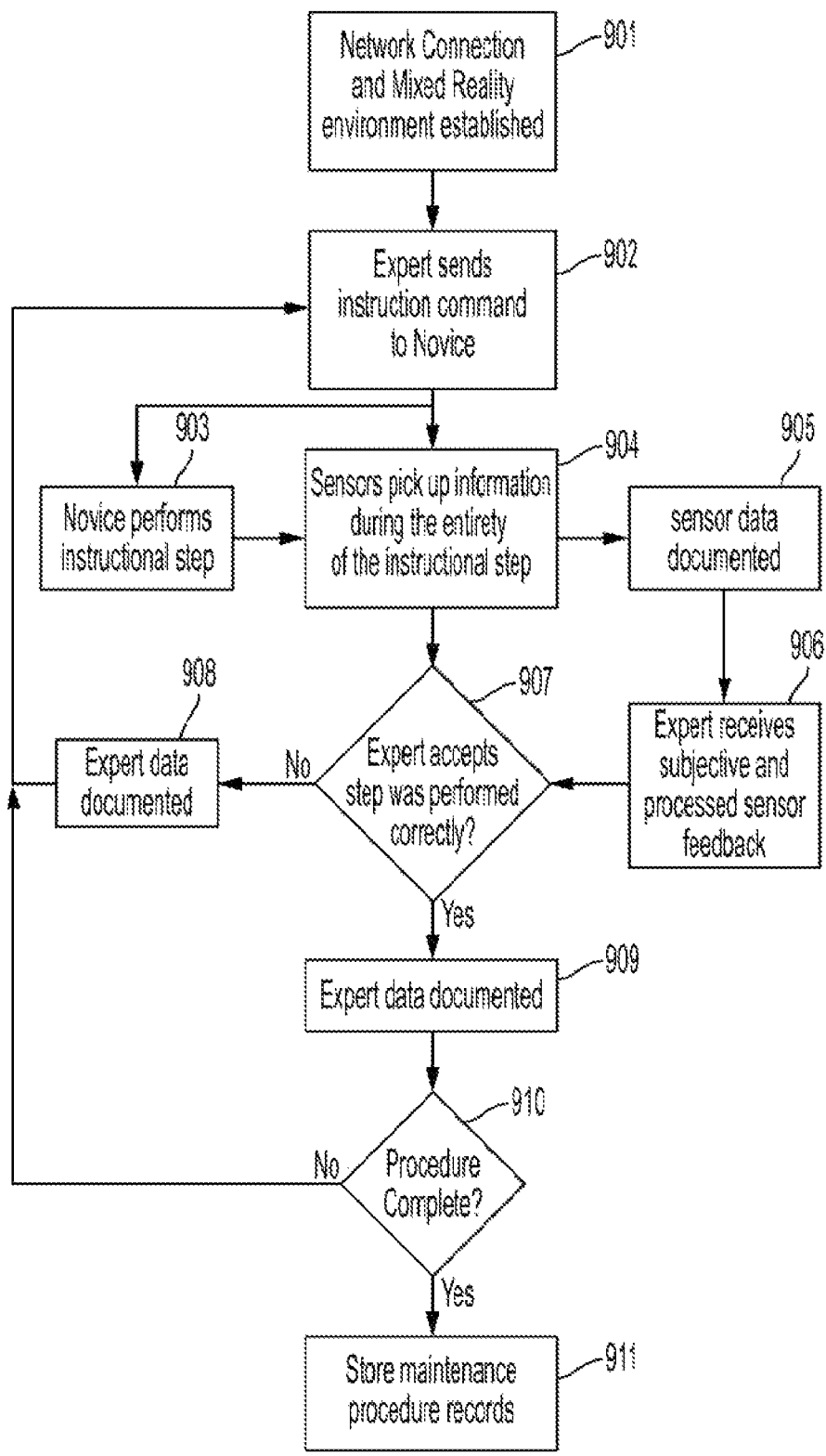
FIG. 17 is a flow chart of a Remote Expert Method and System utilizing Quantitative Assurance in a Mixed Reality Environment according to an exemplary embodiment of this disclosure.

With reference to FIG. 16, shown is an example of a procedure being loaded at runtime by an application and processed to show a specific view according to an exemplary embodiment of this disclosure.

As shown this disclosure, and the exemplary embodiments described herein, has broad application. It applies to any industry and aspect where movement is involved and needs to be understood. This applies basically to any spatial data where information is retained and includes, but is not limited to:

Construction—example: putting in a piece of equipment in a certain position in a room;

Manufacturing—example: assembling a rocket or jet engine;

Maintenance—example: visual inspection of a system, documenting corrosion, or repairing a subsystem;

Agriculture—example: planting of crops in a certain position or order in a field;

Fire Fighting—documenting where fire is active in a wild fire;

Logistics—example: loading and unloading cargo;

Food service—example: preparing a recipe;

Retail—example: replacing items on a shelf to maintain a certain amount of stock, or picking out a specific order;

Retail—example: customer putting together a piece of furniture ordered from a catalog.

Warehousing—example: creating a path for an employee to walk around the room and pick up specific parts for an order;

Landscaping—example: describing the proper size to trim a bush, or the plan to decorate a yard;

Transportation—example: conductor on a train, or how to operate a truck;

Home repair—example: fixing a faucet or installing a new stove;

Tattoo Artist—example: steps to create a certain tattoo;

Dancing—example: creating a dance routine;

Music—example: playing a piano;

Photography—example: using a camera and where to frame a subject in the frame;

Medical—example: showing where to insert stitches on a wound;

Physical therapy—example: exercises for rehabilitation;

Occupational therapy—example: fine motor skills training;

Vocational Rehabilitation—Spatial audio instructions in a headset guiding a blind person around a building;

Speech therapy—example: describing of vocal exercises;

Sports—example: swinging a golf club, a bat, how to throw a football; and

Games—example: where to move in chess.

Remote Expert Method and System Utilizing Quantitative Quality Assurance in Mixed Reality.

Apprenticeship, or the art of knowledge and skill transfer from an Expert to a Novice, has been a foundational human element for many types of tasks primarily expressed in the physical spatial domain. Communication pathways, such as visual (i.e., watch me then you do), auditory (i.e., perform these steps as I tell them to you), and physical interaction (i.e., a teacher physically moving a student through the proper physical mechanics of a baseball swing), are fundamental components of apprenticeship but also tasks in general. Apprentices have studied alongside Experts acquiring knowledge, skills, and abilities (KSA) over time and in close spatial proximity throughout history. This model has proven inefficient at scale for various reasons, one of which is physical separation. How do we mitigate the loss of effective KSA transfer in the maintenance domain where proximity is undesirable or impossible? All systems demand maintenance requiring human intervention with complex machinery and more frequent and developed KSAs. Resourcing expert KSAs for all technicians is wasteful where augmentation mitigates these deficiencies. One may send an Expert to transfer the KSAs physically for one-off tasks or support, but this is costly from the loss of manpower at the primary site and the loss of the Expert to help with other issues during travel.

Current technology implementations do not mitigate this physical proximity of the expert problem. The choice between waiting for the Expert to arrive (effecting cost and schedule) or accepting the possibility that the maintenance action will not be optimally performed is not an obvious one, but also one that may not be necessary. This problem leaves system owners with limited confidence in the quality of their maintenance actions. System owners are then left with aged and inadequate processes for ensuring that meaningful controls are asserted on maintenance actions.

The "Expert" in these scenarios may be an actual human or an application of artificial intelligence (AI) used to validate task completeness. For example, the synthetic Expert utilizes past decision-making from human experts and the sensor data captured in 905, 908, and 909. The information can be sent over as a series of instructions described in parallel content authoring. If a human is the Expert a connection can be made, or the AI could be attached to the instructions (for example, as a module in parallel content authoring).

1) Connection is made between the Expert and Novice (901). If the "Expert" is going to be an AI using historical data, a network does not have to be made. However, AI can be used to augment the human Expert if a networking connection is made. Historical data being leveraged may include analog tasks, as well as, prior individual collected data as well as historic group performances.

2) The virtual 3D representation of the system is aligned on top of the actual physical system creating a mixed reality environment (901).

a. This alignment should continuously be evaluated to ensure that the augmented reality layer has not drifted. For example, the Expert can perform periodic distance comparisons between the point cloud generated by sensors and the 3D model's mesh where the system is being placed in AR.

3) The Expert selects an object on their interface (e.g., left lever) that needs to have an action performed (e.g., turn 90 degrees) and sends the command to the technician's headset or tablet running an augmented reality application (902).

4) The technician physically performs a requested action (903). Then, peripheral sensors (e.g., accelerometers in a maintenance glove, feedback from torque wrenches) along with other sensors (e.g., computer vision in headset detecting hand position) are processed (904), documented (905), and presented to the Expert (906) for sign-off of the step (907).

5) Steps 3 and 4 are repeated (910) until the maintenance task is completed, where the overall procedure is complete, signed off, and recorded (911). Sensor described should be considered non-limiting.

Companies have equipment that needs to be maintained and repaired remotely. Any government program that supports equipment and any large system manufacturer would see a lot of value in this concept. Since the evaluation could be done by an AI this opens up the door to any movement that can be captured with by sensors. Measuring accuracy or completeness in some of these examples:

Construction—example: measuring that a person putting in a piece of equipment in a certain position in a room has done so in a satisfactory manner;

Manufacturing—example: measuring the assembling of a rocket or jet engine has been done so to a standard;

Maintenance—example: confirming that a visual inspection of a system, documenting corrosion, or repairing a subsystem has been done so correctly;

Agriculture—example: planting of crops in a certain position or order in a field has been done so correctly;

Logistics—example: loading and unloading cargo has been done so correctly;

Food service—example: preparing a recipe has been done so according to the standards;

Retail—example: replacing items on a shelf to maintain a certain amount of stock, or picking out a specific order;

Warehousing—example: confirming the path that an employee took to walk around the room and pick up specific parts for an order and confirming those parts were picked up;

Landscaping—example: describing the proper size to trim a bush, or the plan to decorate a yard;

Transportation—example: conductor on a train, or how to operate a truck;

Home repair—example: confirming that a home resident has completed a task within acceptable metrics for repairing a warrantied piece of equipment;

Tattoo Artist—example: measuring that actions of a tattoo artist to create a certain tattoo;

Dancing—example: evaluating that a dancer completed a prescribed routine;

Music—example: evaluating that a person is playing the correct notes with their instrument;

Photography—example: using a camera and where to frame a subject in the frame;

Medical—example: showing where to insert stitches on a wound;

Physical therapy—example: measuring the range of the individual in relationship to the exercises given by a doctor for rehabilitation;

Occupational therapy—example: measuring fine motor skills training;

Speech therapy—example: measuring how close people were to the given vocal exercises;

Sports—example: evaluating the swing of a golf club, a bat, or a football being thrown; and Games—example: confirming that a person has moved to the correct spot in chess when provided a move.

Now Provided are Further Details of Some of the Features and Aspects of this Disclosure Related to a Remote Expert Method and System Utilizing Quantitative Quality Assurance in Mixed Reality.

Figure 18:
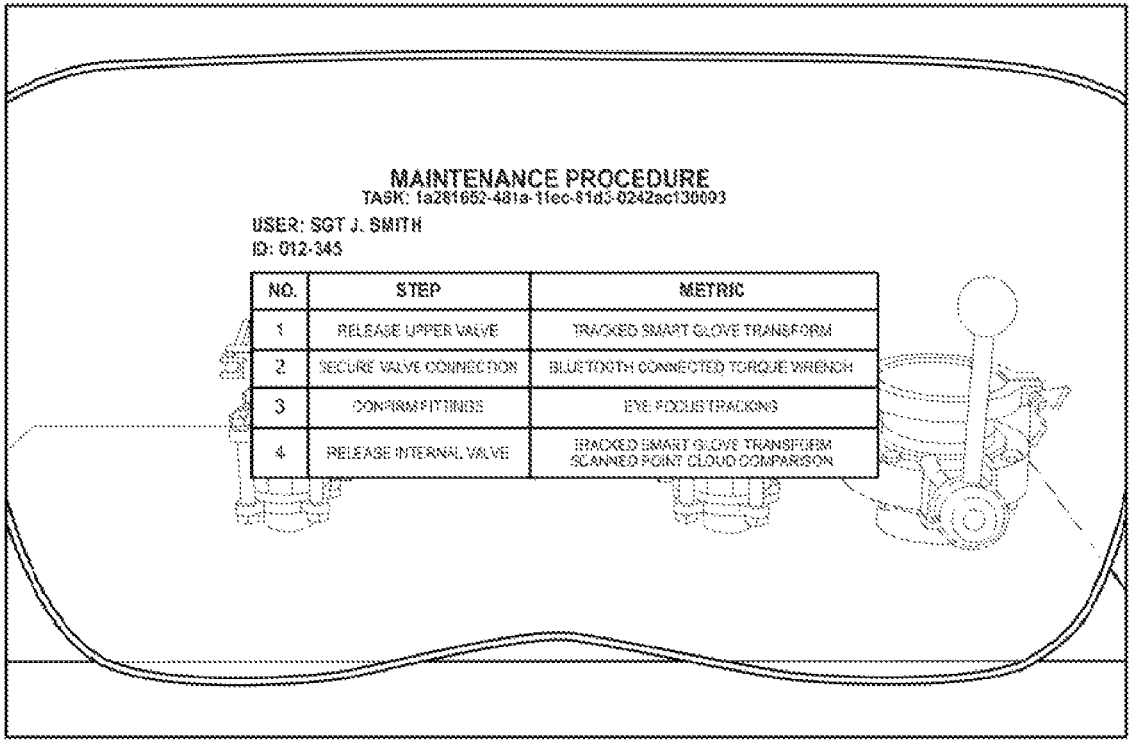
FIG. 18 shows a maintenance procedure assigned to a technician to perform. Each task number is unique, occurring at a particular place and time (e.g., changing a tire on a car Monday would have a different number than performing the procedure again on Tuesday). Each unique task will eventually be stored along with all accompanying data for each step.

With reference to FIG. 18, shown is a maintenance procedure assigned to a technician to perform. Each task number is unique, occurring at a particular place and time (e.g., changing a tire on a car Monday would have a different number than performing the procedure again on Tuesday). Each unique task will eventually be stored along with all accompanying data for each step.

Figure 19:
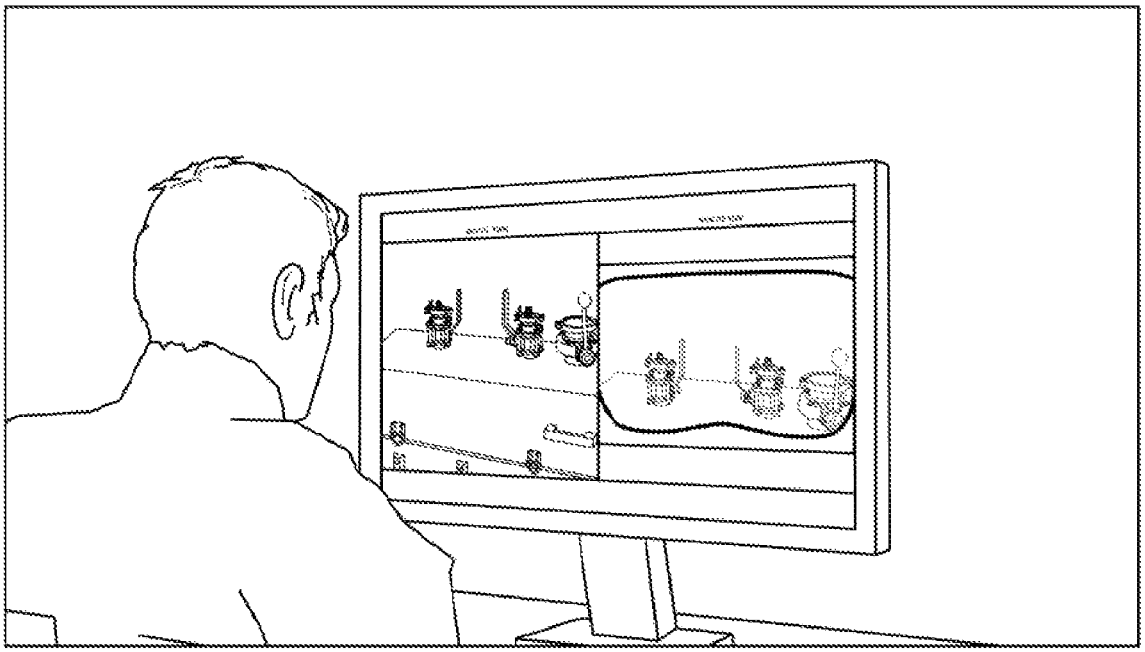
FIG. 19 shows the use of a remote human Expert where a network connection is made between the Expert and the Novice. In this embodiment, on the left window screen, the Expert has the model of the system in an application that they can assign different actions to be performed. On the right window screen, the Expert can see and hear a live camera feed of what the technician sees, along with mixed reality overlays.

With reference to FIGS. 19, shown is the use of a remote human Expert where a network connection is made between the Expert and the Novice. In this embodiment, on the left window screen, the Expert has the model of the system in an application that they can assign different actions to be performed. On the right window screen, the Expert can see and hear a live camera feed of what the technician sees, along with mixed reality overlays.

Figure 20:
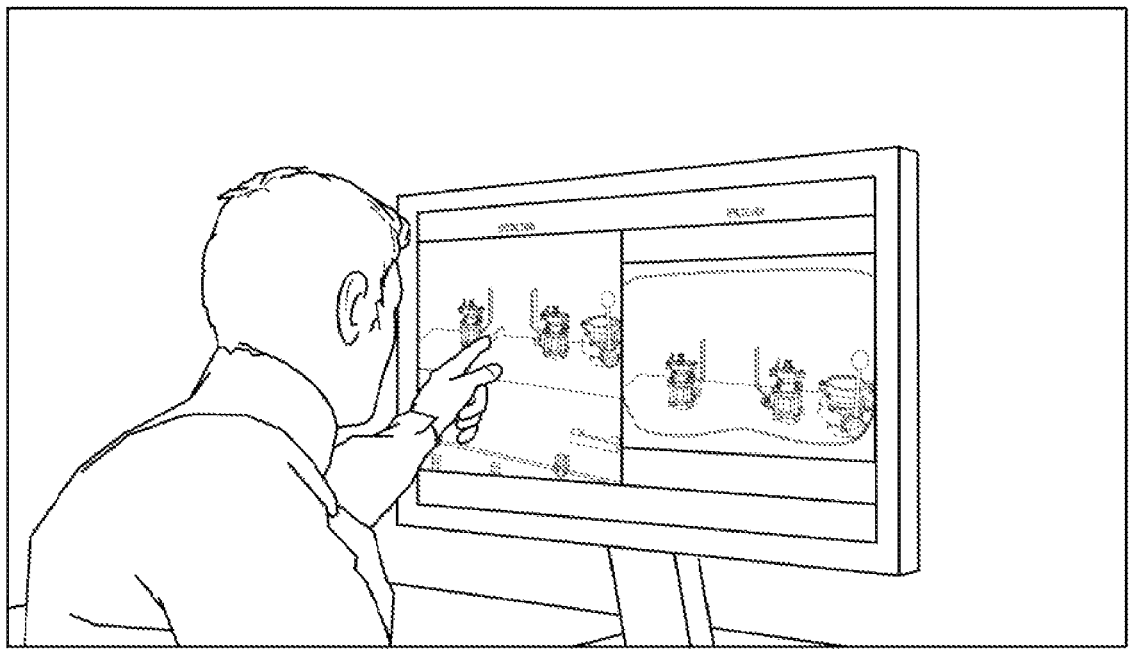
FIG. 20 shows a first step on a system model according to an exemplary embodiment of this disclosure, the Expert selecting a part to be moved. Then, that specific part (e.g., left lever) and action (e.g., "turn 90 degrees away") is transmitted to the Novice.

With reference to FIG. 20, shown a first step on a system model according to an exemplary embodiment of this disclosure, the Expert selecting a part to be moved (selection can occur through any human-computer interaction such as touchscreen, mouse, voice). Then, that specific part (e.g., left lever) and action (e.g., "turn 90 degrees away") is transmitted to the Novice.

Figure 21:
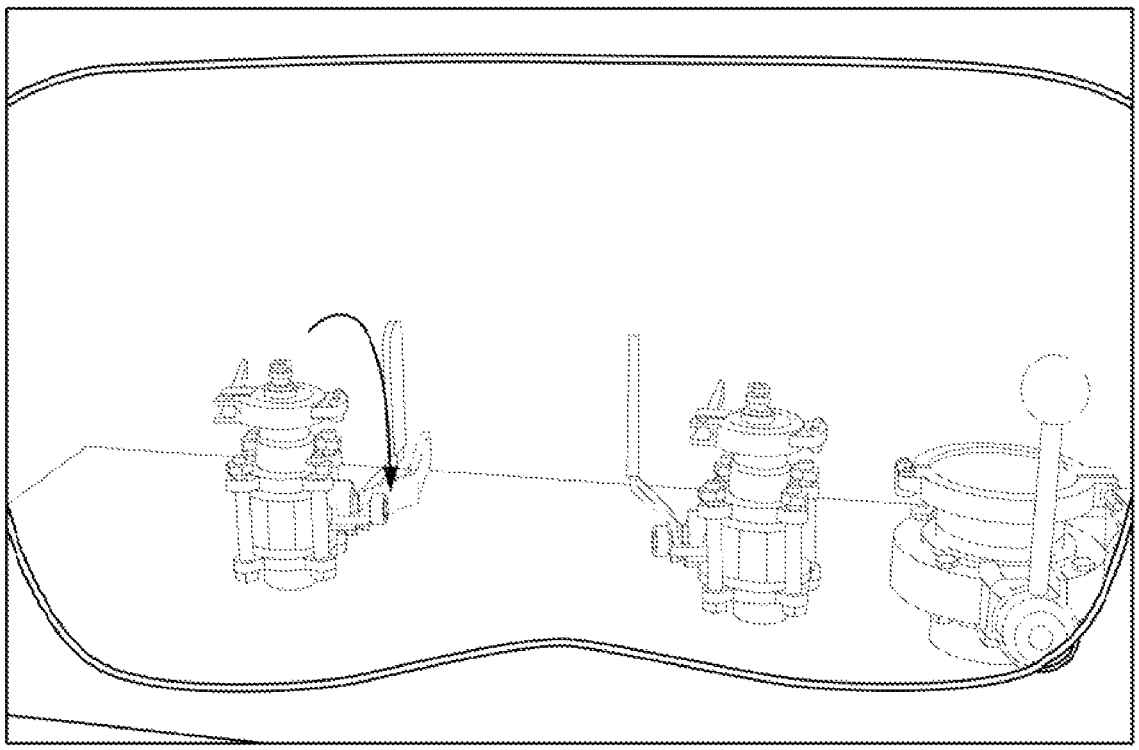
FIG. 21 shows the first step described with reference to FIG. 20, from the Novice's view. As shown, the Novice's view is rendered through an augmented reality headset, however information can alternatively be shown on a pass-through AR system, such as a tablet. This view shows the Novice the visual instruction that was assigned by the Expert.

With reference to FIG. 21, shown is the first step described with reference to FIG. 20, from the Novice's view. As shown, the Novice's view is rendered through an augmented reality headset, however information can alternatively be shown on a pass-through AR system, such as a tablet. This view shows the Novice the visual instruction that was assigned by the Expert.

Figure 22:
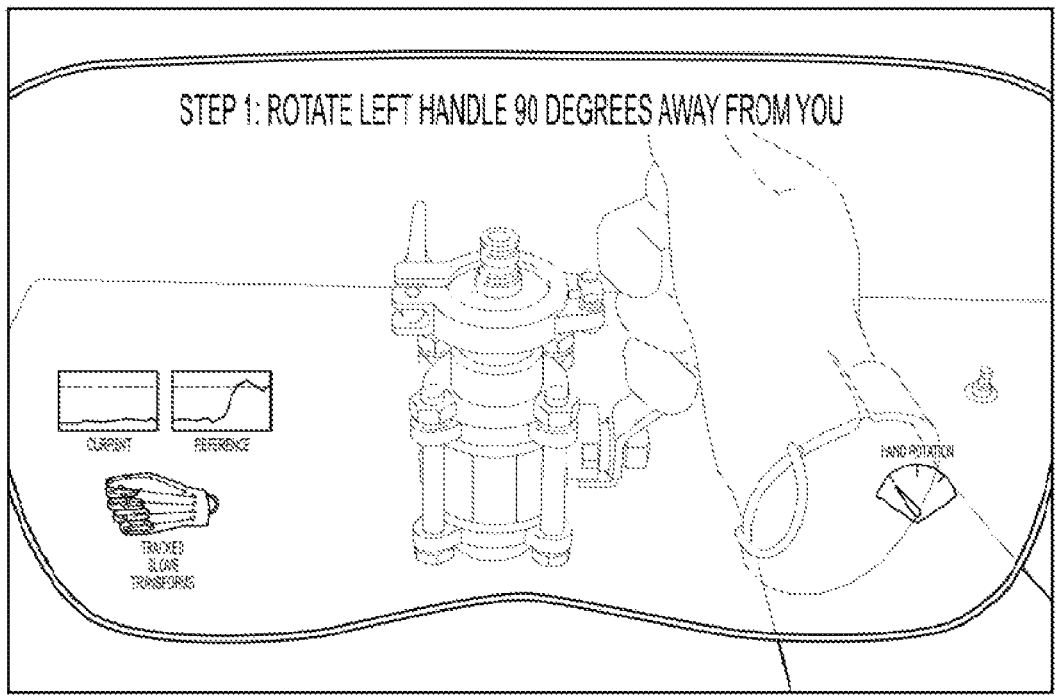
FIG. 22 shows the Novice performing the requested maintenance action from the Expert. Various sensors (directly connected to the headset and peripheral) capture necessary information about the maintenance action.

With reference to FIG. 22, shown is a Novice performing the requested maintenance action from the Expert. Various sensors (directly connected to the headset and peripheral) capture necessary information about the maintenance action.

Figure 23:
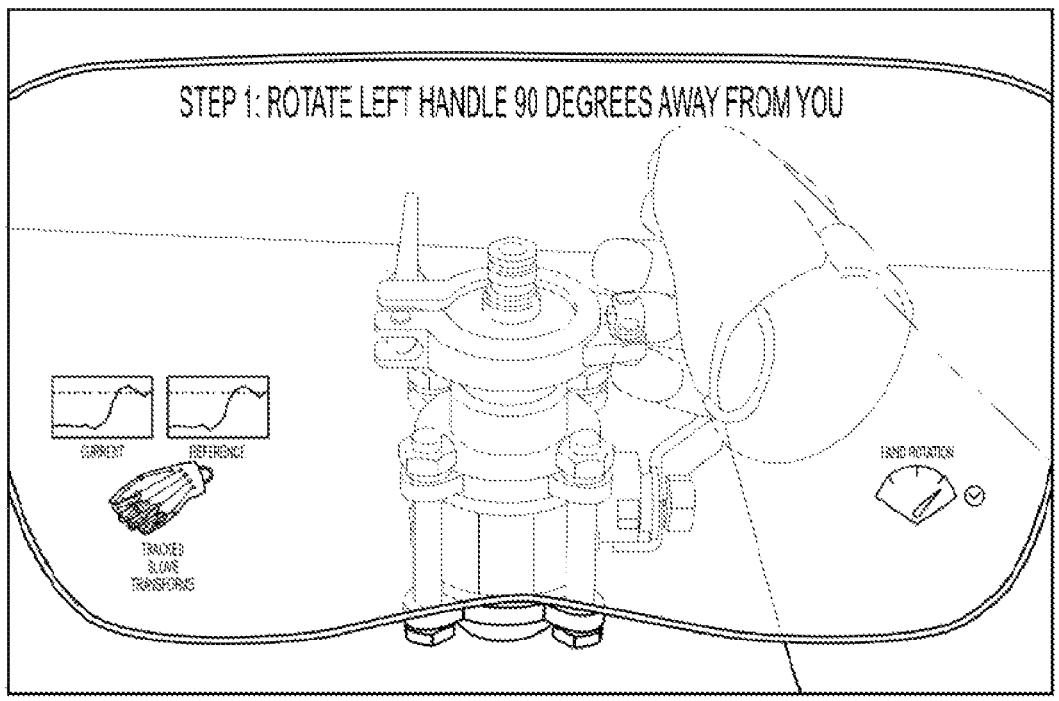
FIG. 23 shows as the maintainer executes the requested action, live sensor feeds are processed, stored, and compared against known envelopes for acceptance, called "signatures," to calculate the confidence that the step was performed correctly.

With reference to FIG. 23, shown is the maintainer as he/she executes the requested action where live sensor feeds are processed, stored, and compared against known envelopes for acceptance, called "signatures," to calculate the confidence that the step was performed correctly. The references shown relate to historical data (can be both individual profiles and group profiles) of that task or analog tasks.

Figure 24:
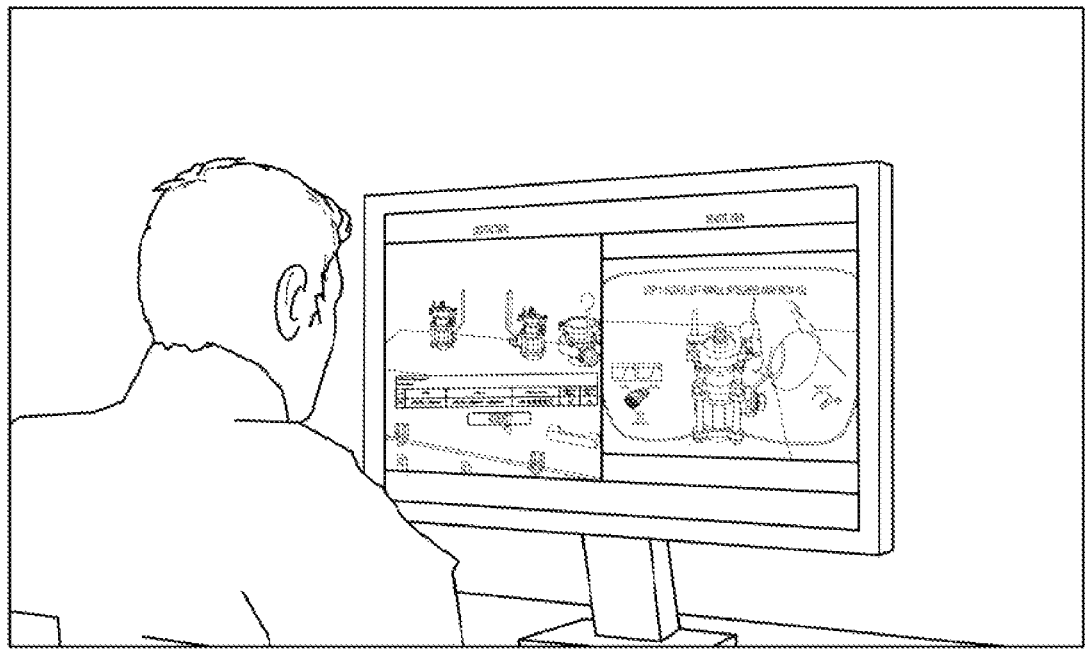
FIG. 24 shows the Expert (actual or synthetic) viewing objective data (i.e., from sensor feeds) and subjective data (e.g., video feed, talking back and forth between Novice) to determine if the step meets the acceptability requirements for sign-off.

With reference to FIG. 24, shown is an Expert (actual or synthetic) viewing objective data (i.e., from sensor feeds) and subjective data (e.g., video feed, talking back and forth between Novice) to determine if the performance on the step meets the acceptability requirements for sign-off.

Figure 25:
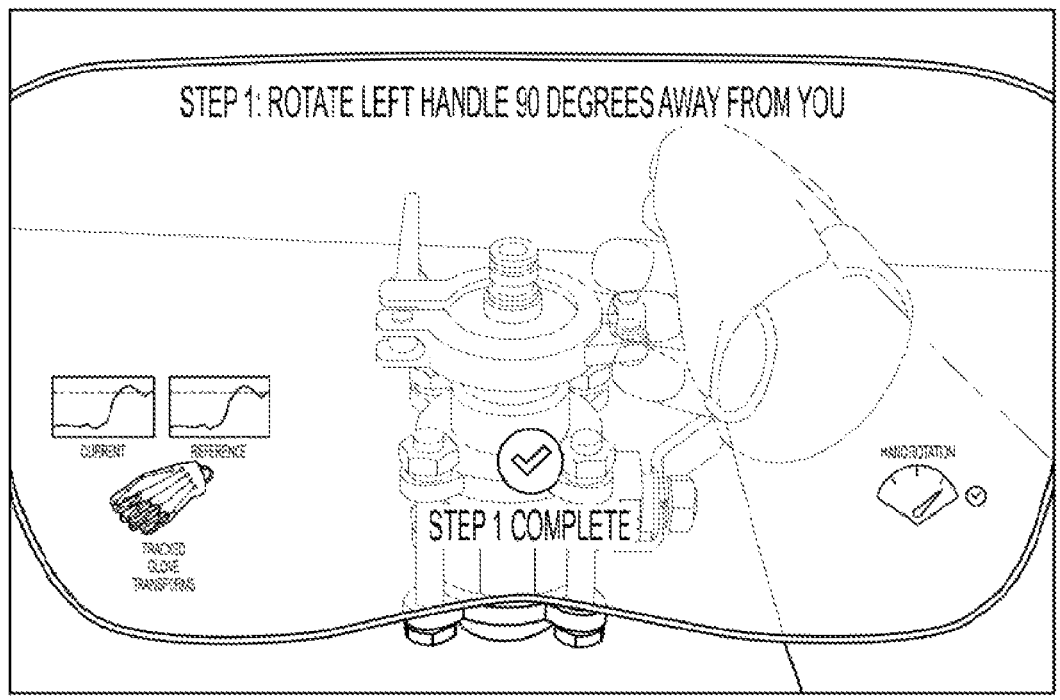
FIG. 25 shows the Expert signing off, and a notification being sent to the Novice.

With reference to FIG. 25, shown is the Expert signing off, and a notification being sent to the Novice.

Figure 26:
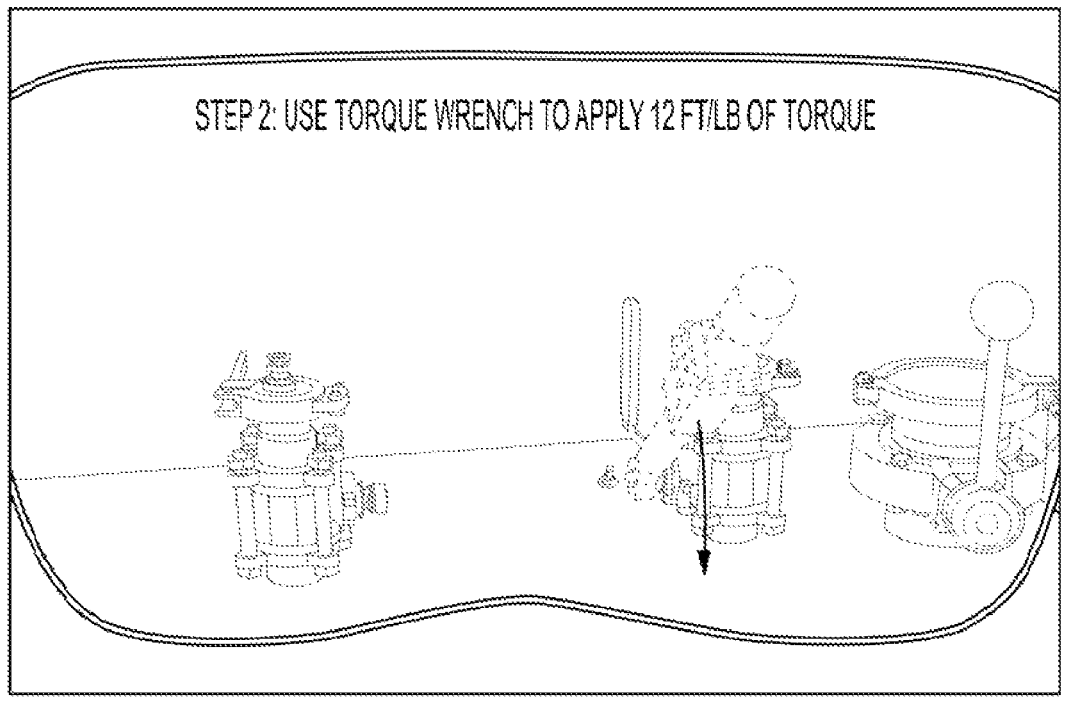
FIG. 26 shows a task step assigned by the Expert that requires a peripheral tool; in this case, a torque wrench to accomplish the task step.

With reference to FIG. 26, shown is a task step assigned by the Expert that requires a peripheral tool; in this case, a torque wrench to accomplish the task step.

Figure 27:
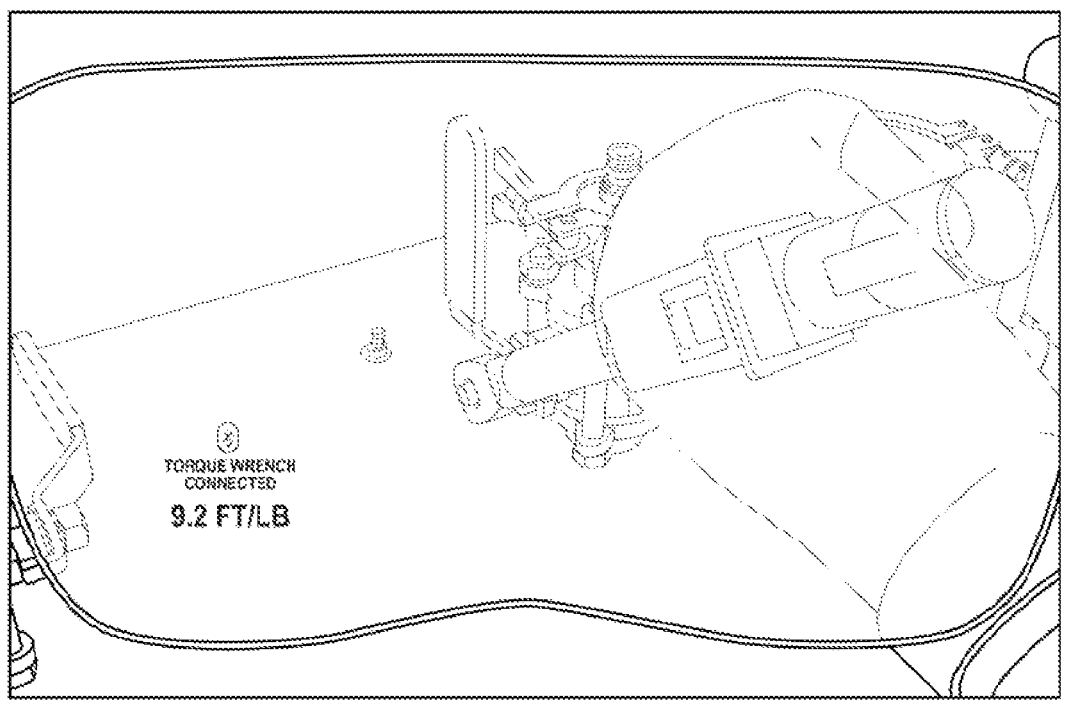
FIG. 27 shows the known pose of hand and torque wrench are continuously stored and evaluated (i.e., is the tool on the correct spot required for this step). Torque information is streamed to determine when the maintainer or Novice hits the requested value.

With reference to FIG. 27, shown is the known pose of hand and torque wrench are continuously stored and evaluated (i.e., is the tool on the correct spot required for this step). Torque information is streamed to determine when the maintainer or Novice hits the requested value.

Figure 28:
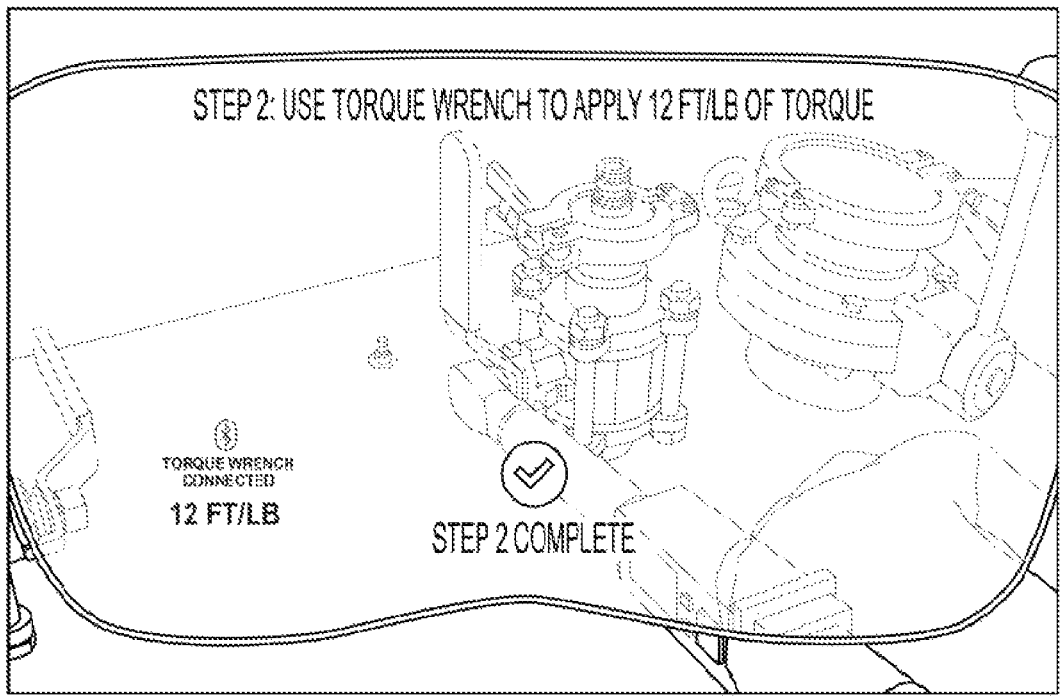
FIG. 28 shows the requested value being hit and feedback from the Expert presented to the user/maintainer/Novice that the step was completed successfully.

With reference to FIG. 28, shown is the requested value being hit and feedback from the Expert presented to the user/maintainer/Novice that the step was completed successfully.

Figure 29:
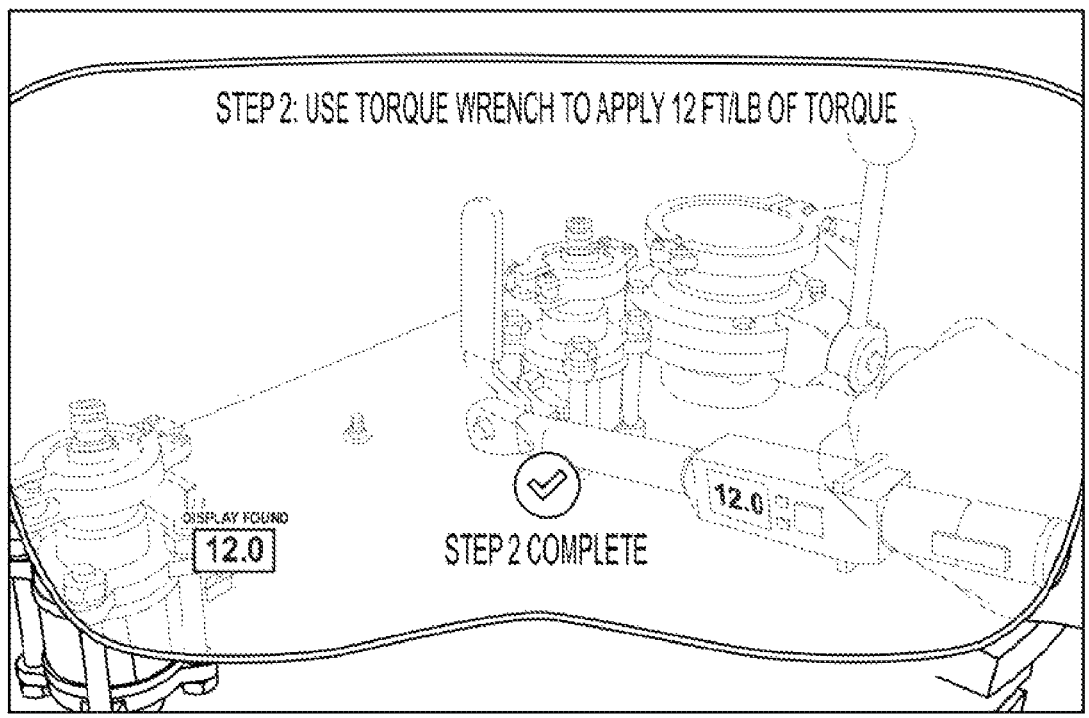
FIG. 29 shows the case where streaming data cannot be collected and where information can be read from the tools by other means. Shown here, an optical character recognition algorithm determines the correct torque value was achieved.

With reference to FIG. 29, shown is the case where streaming data cannot be collected and where information can be read from the tools by other means. Shown here, an optical character recognition algorithm determines the correct torque value was achieved.

Figure 30:
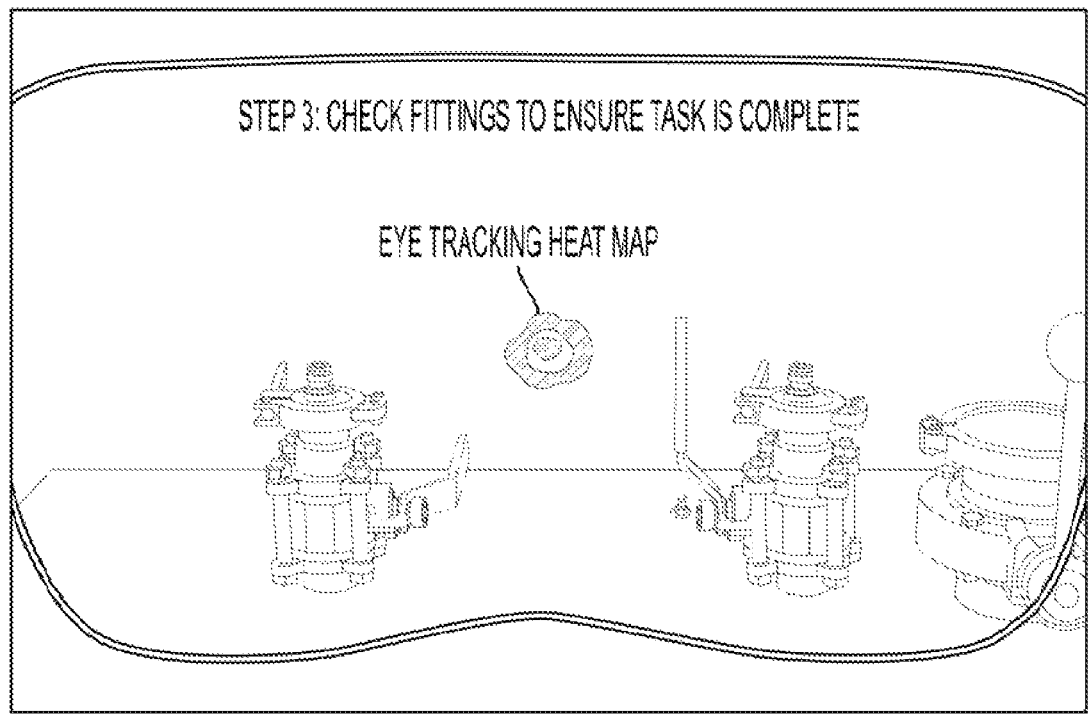
FIG. 30 show data being collected that does not require touch for assessment. In this case, eye-tracking determines what objects the Novice is looking at in an example task step shown as a heatmap.

With reference to FIGS. 30, shown is data being collected that does not require touch for assessment. In this case, eye-tracking determines what objects the Novice is looking at in an example task step shown as a heatmap.

Figure 31:
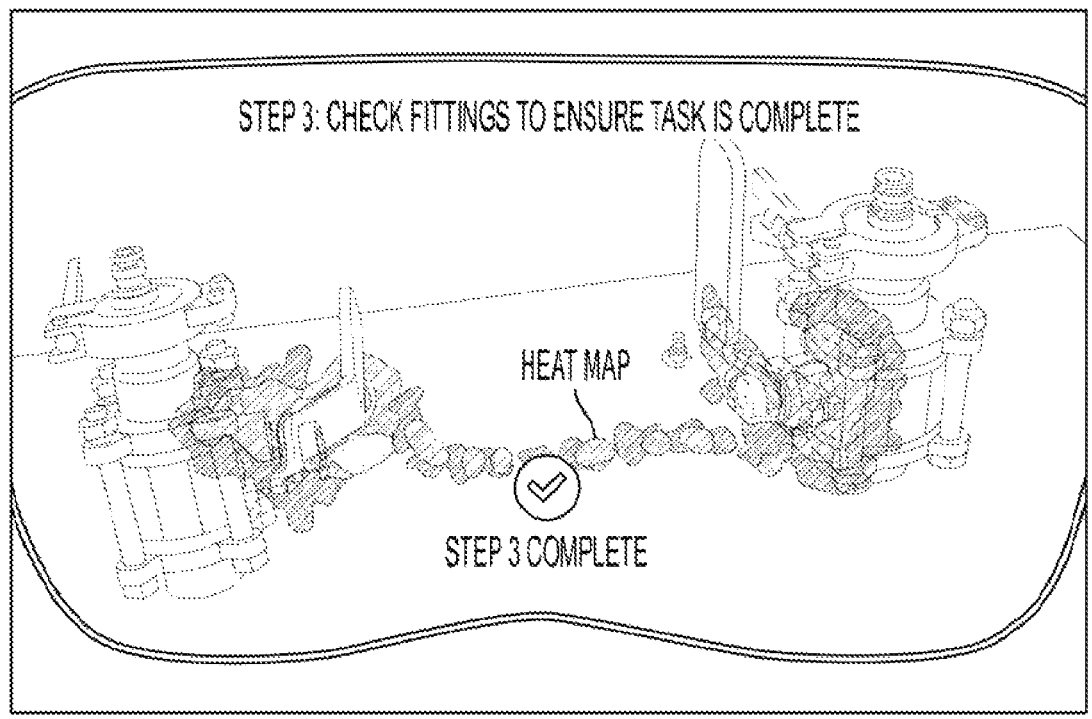
FIG. 31 show the heatmap produced by the Novice performing the task step is recorded and evaluated to determine if it meets the acceptability envelope for this task step.

With reference to FIGS. 31, shown is a heatmap produced by the Novice performing the task step is recorded and evaluated to determine if it meets the acceptability envelope for this task step. Further sensors like electroencephalogram (EEG) information could be used to validate that the person understood what they were looking at.

Figure 32:
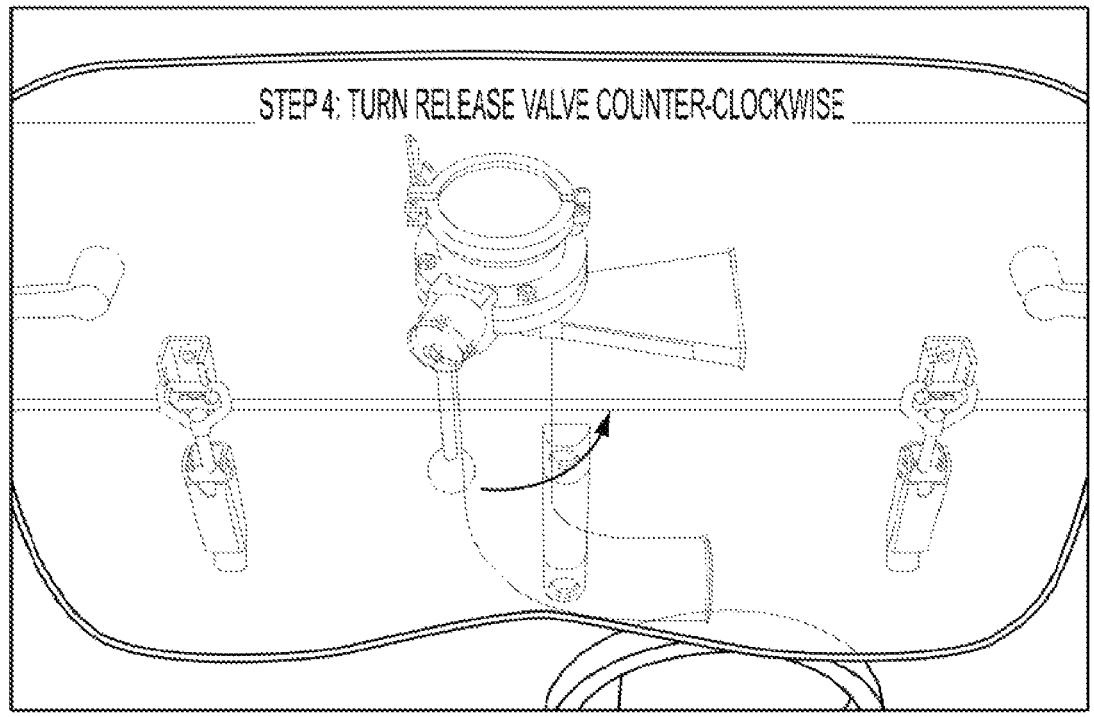
FIG. 32 shows a mixed reality environment where it is also possible to perform task steps that the Novice cannot see directly. In this example, a lever must be manipulated within the system. "X-ray" vision, based on a 3D model, is presented to the Novice to spatially orient themselves on how to perform the task.

With reference to FIG. 32, shown is a mixed reality environment where it is also possible to perform task steps that the Novice cannot see directly. In this example, a lever must be manipulated within the system. "X-ray" vision, based on a 3D model, is presented to the Novice to spatially orient themselves on how to perform the task.

Figure 33:
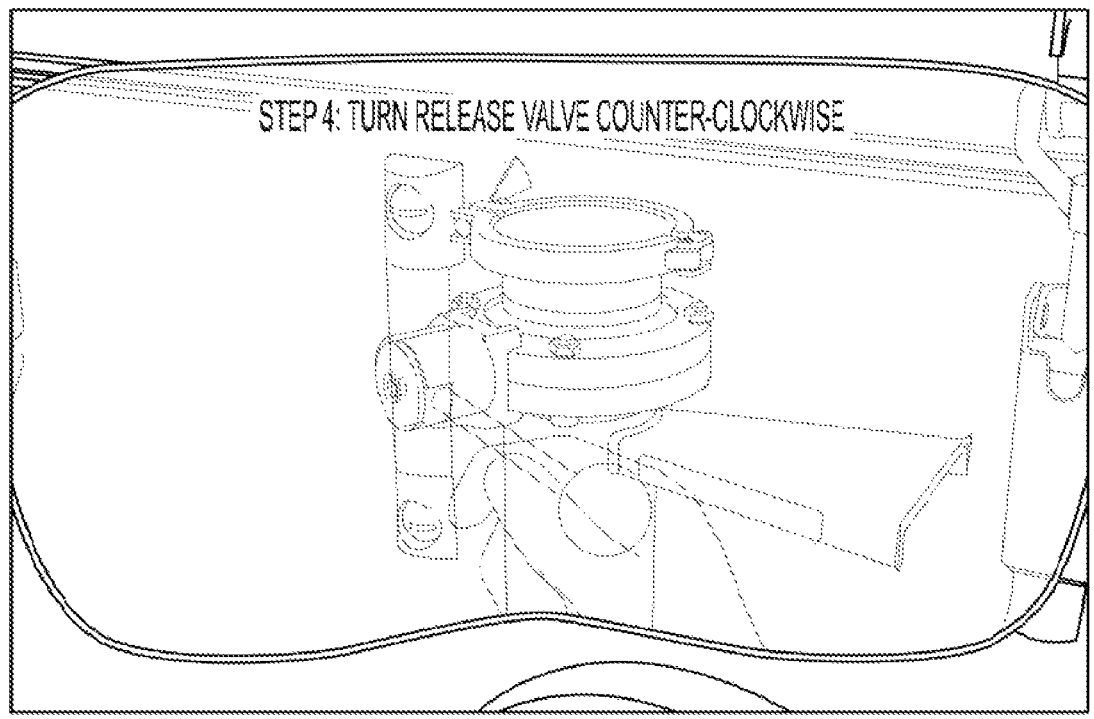
FIG. 33 shows the Novice performing the requested action and can visualize the step as it is being executed—in this example, turning a lever.

With reference to FIG. 33, shown is a Novice performing the requested action and can visualize the step as it is being executed—in this example, turning a lever. The maintainer's hand in this case is not physically viewable but is calculated using sensors and shown to the both the maintainer as well as expert.

Figure 34:
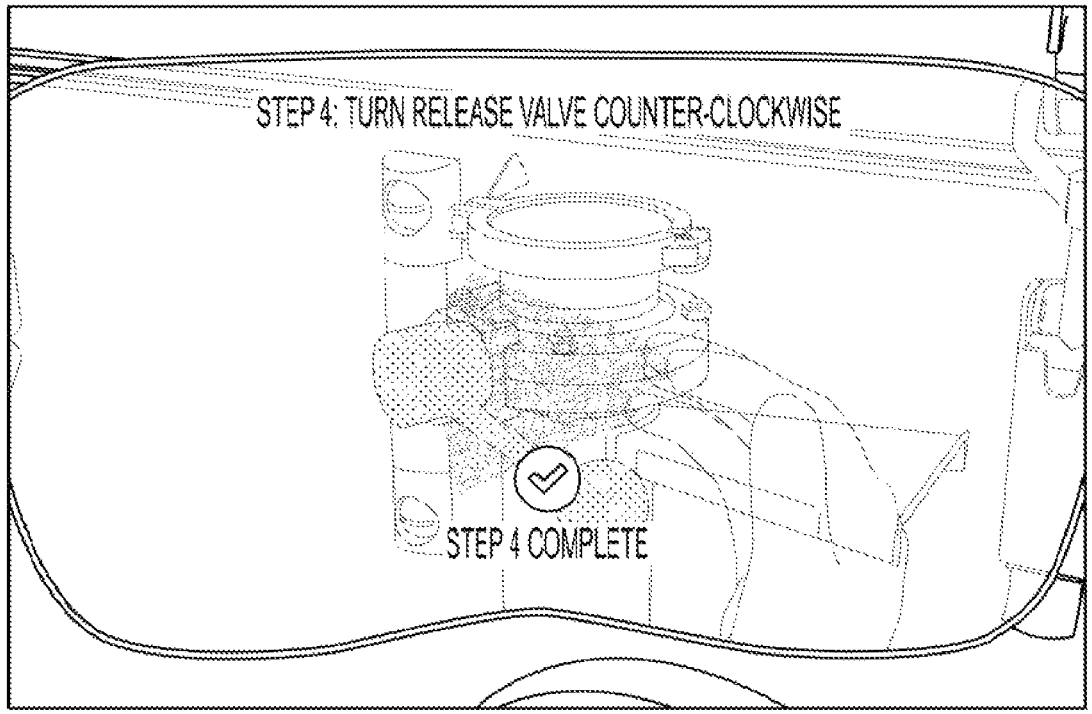
FIG. 34 shows an optional post-step validation process by scanning the area to determine the position of the lever on the machine (in this case, confirming the lever is in the horizontal position). Because the fingertip positions are known, it allows information on the system's physical state to be collected.

With reference to FIG. 34, shown is an optional post-step validation process performed by scanning the area to determine the position of the lever on the machine (in this case, confirming the lever is in the horizontal position). Because the fingertip positions are known, it allows information on the system's physical state to be collected.

Figure 35:
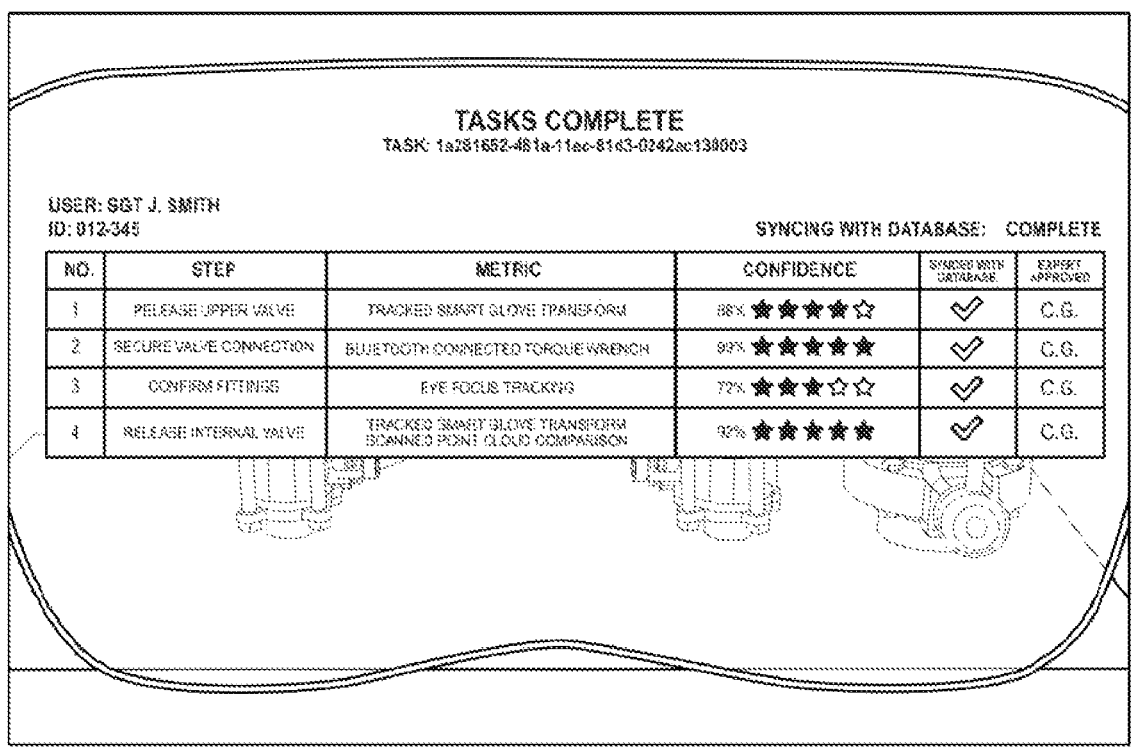
FIG. 35 shows FIG. 34 illustrated as an optional screen presented to the Novice showing the completed steps, including an accompanying calculated confidence, the status of syncing, and other important pieces of information.

With reference to FIG. 35, shown is FIG. 34 illustrated as an optional screen presented to the Novice showing the completed steps, including an accompanying calculated confidence of the system, the status of syncing, expert signoff, and other important pieces of information.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical, or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for remote expert utilizing quantitative quality assurance in a mixed reality system, the method comprising:
    (a) presenting a 3D representation of target equipment to an expert user, wherein a synchronized 3D representation of the target equipment is presented to a novice user;
    (b) receiving a part selection and a requested action for an equipment part of the target equipment from the expert user;
    (c) parallel authoring, by a sensor, wherein the sensor creates a data structure based at least in part on information collected from a mixed reality environment, wherein the data structure is paralleled to author multiple outputs, the multiple outputs comprising position, corrosion type, and job control number;
    (e) presenting the novice user's performance of the requested action on the equipment part to the expert user, wherein the presentation of the novice user's performance comprises various sensor data collected at the novice user's physical environment location;
    (f) validating, by a direct measures feedback, the novice user's performance of the requested action;
    (g) generating a confidence assessment of the novice user's performance of the requested action, wherein the confidence assessment specifies whether the expert user rejects the requested action as failing performance requirements, based at least in part on an indirect measures or the direct measures feedback;
    (h) if the requested action is rejected as failing performance requirements, repeating steps (c)-(e) until the expert accepts the requested action as satisfying the performance requirements; and
    (i) repeating steps (a)-(h) until a plurality of requested actions are accepted by the expert as satisfying the performance requirements, wherein the plurality of requested actions complete a maintenance task.

2. The method of claim 1, wherein the expert has a digital twin of the target equipment that the novice user is manipulating, whereas the novice user manipulates physical characteristics of the target equipment, the manipulations are reproduced digitally in the expert user's digital twin model.

3. The method of claim 1, wherein the requested action can be sent, executed, and signed off asynchronously.

4. The method of claim 1, wherein the expert user can be a human or a computing device with artificial intelligence.

5. The method of claim 1, wherein a first cloud mesh of the 3D presentation of the target equipment is periodically aligned with a second cloud mesh of the synchronized 3D representation.

6. The method of claim 1, wherein the requested action comprises a description of the requested action.

7. The method of claim 1, wherein the requested action comprises an animated 3D overlay of the requested action.

8. The method of claim 1, wherein the requested action comprises a target performance metric for a smart tool being used by the novice user to perform the requested action.

9. The method of claim 1, wherein the confidence assessment comprises an algorithm derived confidence or an expert user's confidence that the requested action satisfies the performance requirements.

10. The method of claim 1, wherein the sensor data is collected by at least one sensor selected from a group consisting of smart gloves, electromyography (EMG) sensor body position data, electroencephalography (EEG) signals, head mounted camera, tripod mounted camera in a known physical, camera position, and a laser tool in a known physical, laser position, and wherein the confidence assessment further comprises measurements by an equipment sensor that provides completion data for automatically determining whether the requested action is completed.

11. A remote expert system utilizing quantitative quality assurance, the remote expert system comprising:
a mixed reality controller performing a method to:
define a coordinate system frame of reference for a target physical system, the coordinate system frame of reference including an initial point of the target physical system and at least one directional axis that are specified by a user of the mixed reality controller;
define additional points of the target physical system; and
define interface elements of the target physical system; and
a computer system performing a method to:
generate a 3D model of the target physical system based on the coordinate system frame of reference, the additional points, and the interface elements;
(a) present the 3D representation of target equipment to an expert user, wherein a synchronized 3D representation of the target equipment is presented to a novice user;
(b) receive a part selection and a requested action for an equipment part of the target equipment from the expert user;
(c) parallel author, by a sensor, wherein the sensor creates a data structure based at least in part on information collected from a mixed reality environment, wherein the data structure is paralleled to author multiple outputs, the multiple outputs comprising position, corrosion type, and job control number;
(d) present the novice user's performance of the requested action on the equipment part to the expert user, wherein the presentation of the novice user's performance comprises various sensor data collected at the novice user's physical environment location;
(e) validate, by a direct measures feedback, the novice user's performance of the requested action;
(f) generate a confidence assessment of the novice user's performance of the requested action, wherein the confidence assessment specifies whether the expert user rejects the requested action as failing performance requirements, based at least in part on an indirect measures or the direct measures feedback;
(g) if the requested action is rejected as failing performance requirements, repeat steps (c)-(e) until the expert accepts the requested action as satisfying the performance requirements; and
(h) repeat steps (a)-(g) until a plurality of requested actions are accepted by the expert as satisfying the performance requirements, wherein the plurality of requested actions complete a maintenance task.

12. The remote expert system utilizing quantitative quality assurance according to claim 11, wherein the expert has a digital twin of the target equipment that the novice user is manipulating, whereas the novice user manipulates physical characteristics of the target equipment, the manipulations are reproduced digitally in the expert user's digital twin model.

13. The remote expert system utilizing quantitative quality assurance according to claim 11, wherein the requested action can be sent, executed, and signed off asynchronously.

14. The remote expert system utilizing quantitative quality assurance according to claim 11, wherein the expert user can be a human or a computing device with artificial intelligence.

15. The remote expert system utilizing quantitative quality assurance according to claim 11, wherein a first cloud mesh of the 3D presentation of the target equipment is periodically aligned with a second cloud mesh of the synchronized 3D representation.

16. The remote expert system utilizing quantitative quality assurance according to claim 11, wherein the requested action comprises a description of the requested action.

17. The remote expert system utilizing quantitative quality assurance according to claim 11, wherein the requested action comprises an animated 3D overlay of the requested action.

18. The remote expert system utilizing quantitative quality assurance according to claim 11, wherein the requested action comprises a target performance metric for a smart tool being used by the novice user to perform the requested action.

19. The remote expert system utilizing quantitative quality assurance according to claim 11, wherein the confidence assessment comprises an algorithm derived confidence or an expert user's confidence that the requested action satisfies the performance requirements.

20. The remote expert system utilizing quantitative quality assurance according to claim 11, wherein the sensor data is collected by at least one sensor selected from a group consisting of smart gloves, electromyography (EMG) sensor body position data, electroencephalography (EEG) signals, head mounted camera, tripod mounted camera in a known physical, camera position, and a laser tool in a known physical, laser position, and wherein the confidence assessment further comprises measurements by an equipment sensor that provides completion data for automatically determining whether the requested action is completed.

21. A non-transitory computer-readable medium comprising executable instructions for causing a computer system to perform a method for remote expert utilizing quantitative quality assurance in a mixed reality system, the instructions when executed causing the computer system to:
(a) present a 3D representation of target equipment to an expert user, wherein a synchronized 3D representation of the target equipment is presented to a novice user;
(b) receive a part selection and a requested action for an equipment part of the target equipment from the expert user;
(c) present the novice user's performance of the requested action on the equipment part to the expert user, wherein the presentation of the novice user's performance comprises various sensor data collected at the novice user's physical environment location;

(d) parallel author, by a sensor, wherein the sensor creates a data structure based at least in part on information collected from a mixed reality environment, wherein the data structure is paralleled to author multiple outputs, the multiple outputs comprising position, corrosion type, and job control number;

(e) validate, by a direct measures feedback, the novice user's performance of the requested action;

(f) generate a confidence assessment of the novice user's performance of the requested action, wherein the confidence assessment specifies whether the expert user rejects the requested action as failing performance requirements, based at least in part on an indirect measures or the direct measures feedback;

(g) if the requested action is rejected as failing performance requirements, repeat steps (c)-(d) until the expert accepts the requested action as satisfying the performance requirements; and (h) repeat steps (a)-(g) until a plurality of requested actions are accepted by the expert as satisfying the performance requirements, wherein the plurality of requested actions complete a maintenance task.

* * * * *